(12) United States Patent
Gabriel et al.

(10) Patent No.: US 11,778,465 B2
(45) Date of Patent: Oct. 3, 2023

(54) WIRELESS AUTHENTICATION SYSTEMS

(71) Applicant: 3M INNOVATIVE PROPERTIES COMPANY, St. Paul, MN (US)

(72) Inventors: Nicholas T. Gabriel, Grand Rapids, MN (US); Ronald D. Jesme, Plymouth, MN (US); Justin Tungjunyatham, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 509 days.

(21) Appl. No.: 16/614,548

(22) PCT Filed: Jun. 20, 2018

(86) PCT No.: PCT/IB2018/054552
§ 371 (c)(1),
(2) Date: Nov. 18, 2019

(87) PCT Pub. No.: WO2018/235018
PCT Pub. Date: Dec. 27, 2018

(65) Prior Publication Data
US 2020/0187005 A1    Jun. 11, 2020

Related U.S. Application Data

(60) Provisional application No. 62/523,986, filed on Jun. 23, 2017.

(51) Int. Cl.
*H04W 12/06* (2021.01)
*H04W 12/08* (2021.01)
(Continued)

(52) U.S. Cl.
CPC .......... *H04W 12/068* (2021.01); *G06F 1/163* (2013.01); *G06F 16/2255* (2019.01);
(Continued)

(58) Field of Classification Search
CPC ... H04W 12/068; H04W 12/04; H04W 12/08; H04W 4/80; G06F 16/2255; G06F 1/163; G06F 21/602; H04B 1/385
See application file for complete search history.

(56) References Cited

U.S. PATENT DOCUMENTS 9,379,894 B1    6/2016    Luo
9,648,014 B2 *  5/2017    Tobin .................... H04W 12/50
(Continued)

FOREIGN PATENT DOCUMENTS

CN    101334830 A    12/2008
CN    10333811 A     10/2013
(Continued)

OTHER PUBLICATIONS

"NT2H1311TT NTAG 213 TT—NFC T2T Compliant IC With Tag Tamper feature", NXP Semiconductors, Revision 1.1, Objective Data Sheet, 2017, pp. 1-57.
(Continued)

*Primary Examiner* — Alexander Lagor
*Assistant Examiner* — Zoha Piyadehghibi Tafaghodi
(74) *Attorney, Agent, or Firm* — Sriram Srinivasan

(57) ABSTRACT

Embodiments include wireless authentication devices, systems, and methods. A wireless authentication system can include an active wireless communication device including a first memory, first processing circuitry, and a first antenna, the first processing circuitry to produce an identifier request for an identifier (ID) and cause the first antenna to transmit the identifier request, receive the ID in a response to the identifier request, identify, based on the ID and data in the first memory, a location of a second memory to access, and produce an access request for the identified location of the second memory and cause the first antenna to transmit the access request. The system can further include a passive
(Continued)

wireless communication device comprising a second memory, second processing circuitry, a second antenna, and a power harvesting circuitry to convert electromagnetic power incident on the second antenna to electrical power for the second memory and the second processing circuitry, the second processing circuitry to produce the response to the identifier request, the response including the ID, and cause the second antenna to produce the response, receive the access request, retrieve data from or write data to the identified location of the second memory based on the access request, and cause the second antenna to transmit the response to the access request.

12 Claims, 9 Drawing Sheets

(51) Int. Cl.
```
G06F 16/22    (2019.01)
G06F 1/16     (2006.01)
G06F 21/60    (2013.01)
H04W 12/04    (2021.01)
H04W 4/80     (2018.01)
H04B 1/3827   (2015.01)
```
(52) U.S. Cl.
CPC .......... *G06F 21/602* (2013.01); *H04W 12/04* (2013.01); *H04W 12/08* (2013.01); *H04B 1/385* (2013.01); *H04W 4/80* (2018.02)

(56) References Cited

U.S. PATENT DOCUMENTS

| | | | |
|---|---|---|---|
| 9,668,217 B1 * | 5/2017 | Bamberger | ........... H04W 36/14 |
| 2009/0289776 A1 | 11/2009 | Moore et al. | |
| 2010/0134257 A1 | 6/2010 | Puleston et al. | |
| 2011/0070828 A1 | 3/2011 | Griffin et al. | |
| 2013/0225073 A1 * | 8/2013 | O'Donoghue | ........... H04W 4/80 |
| | | | 455/41.1 |
| 2014/0006797 A1 * | 1/2014 | Cordella | ............. G06F 12/1408 |
| | | | 713/189 |
| 2014/0201536 A1 * | 7/2014 | Fiske | .................... H04L 9/0844 |
| | | | 726/18 |
| 2015/0051730 A1 | 2/2015 | Portney et al. | |
| 2015/0332031 A1 * | 11/2015 | Mistry | .................. H04W 12/06 |
| | | | 726/19 |
| 2016/0328159 A1 * | 11/2016 | Coddington | ........ H04L 63/1408 |
| 2017/0011210 A1 * | 1/2017 | Cheong | .................. A61B 5/681 |

FOREIGN PATENT DOCUMENTS

| | | |
|---|---|---|
| CN | 104166871 A | 11/2014 |
| EP | 2663110 | 11/2013 |
| GB | 2545514 | 6/2017 |
| WO | WO 2009-052059 | 4/2009 |
| WO | WO 2009-097577 | 8/2009 |
| WO | WO 2016-073327 | 5/2016 |
| WO | WO 2016-073344 | 5/2016 |
| WO | WO 2016-073408 | 5/2016 |
| WO | WO 2016-073413 | 5/2016 |

OTHER PUBLICATIONS

"NTAG213/215/216 NFC Forum Type 2 Tag Compliant IC With 144/504/888 Bytes User Memory", NXP Semiconductors, Revision 3.2, Product Data Sheet, 2017, pp. 1-60.

"SLZS6002 ICODE DNA", NXP Semiconductors, Revision 3.0, Product Short Data Sheet, 2016, pp. 1-14.

Avoine, "Pitfalls in Ultralightweight Authentication Protocol Designs", IEEE Transactions on Mobile Computing, 2017, pp. 1-17.

Juels, "RFID Security and Privacy: A Research Survey", RSA Laboratories, 2017, pp. 1-19.

International Search Report for PCT International Application No. PCT/IB2018/054552, dated Oct. 10, 2018, 4 pages.

* cited by examiner

WIRELESS AUTHENTICATION SYSTEMS

This application claims the benefit of U.S. Provisional Applications No. 62/523986, filed Jun. 23, 2017, which is incorporated by reference in its entirety herein.

BACKGROUND

Counterfeiting of branded consumable products has been a problem for many industries. Different radio frequency identification (RFID), Near Field Communication (NFC), global positioning system (GPS), Bluetooth (e.g., Bluetooth low energy (BLE)), optical, proximity, and other technologies have been employed to combat consumable counterfeits. Some existing systems use a secure central database model, in which a reader queries data from a tag and then forwards a tag response to a central database. The central database then authenticates the reader and verifies that the tag response is genuine.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
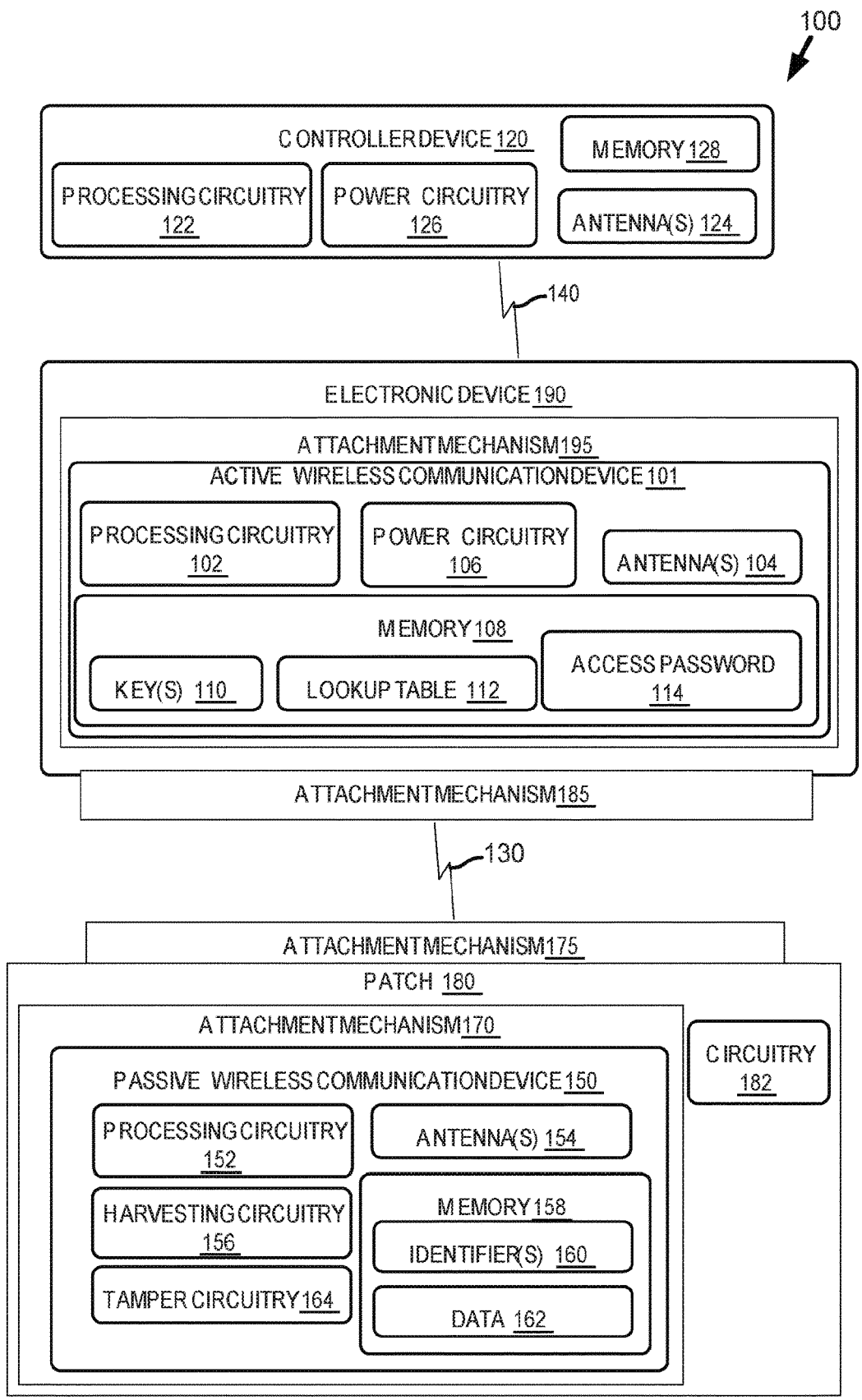
FIG. 1 illustrates, by way of example, a schematic diagram of an embodiment of a wireless authentication system.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for description only and not of limitation. Any use of section headings is intended to aid reading of the document and is not to be interpreted as limiting; information that is relevant to a section heading can occur within or outside of that section.

In the methods described herein, the operations can be carried out in any order without departing from the principles of the embodiments, except when a temporal or operational sequence is explicitly recited. Specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

There are many cases where a reader (e.g., an active wireless communication device) may not have access or connection to a central database, such as in systems previously presented. Such access issues can limit authentication capabilities of the reader and tag (e.g., a passive wireless communication device). Access can be limited to communications between the reader and tag, sometimes referred to as offline authentication. This type of offline authentication presents a significant security challenge due to the limitations of computation and memory resources of the reader and the tag. Further, there is no centralized database that can help the system in performing authentication process and verify authenticity of tags and readers. There have been growing numbers of lightweight security and encryption protocols to address the resource-constrained systems. Many of the existing server-less and lightweight reader and tag communication protocols focus on an encryption/decryption process of the data stream between the reader and the tag, as well as the tag memory data itself. Even if an identifier emitted by a tag has been encrypted and has no intrinsic meaning, it can still enable tracking by a third party. An encrypted identifier may be just a meta-identifier. The encrypted identifier can be static, and therefore subject to tracking like any other serial number. At least one study reports that most of the lightweight security and encryption protocols have been broken in less than a year.

Embodiments include a wireless authentication system that includes an active wireless communication device (e.g., a reader) and a passive wireless communication device (e.g., a tag). The active wireless communication device (AWCD) can request an identifier of the passive wireless communication device (PWCD). The PWCD can respond with the requested identifier. The AWCD can use the identifier of the PWCD, such as in combination with a secret key stored on a memory of AWCD, to determine a memory organization of the PWCD, an access password of the PWCD, and/or an encryption/decryption process and/or key. In one or more embodiments, the AWCD can use the identifier of the PWCD, such as in combination with a secret key stored on a memory of AWCD, to determine a process of a plurality of processes to use in determining the memory organization of the PWCD, the access password of the PWCD, and/or in encrypting/decrypting data to/from the PWCD. The AWCD can provide a command to write data to or read data from a specific memory location of the PWCD, such as based on the determined memory organization. The PWCD can respond by writing data to and providing an acknowledge communication or reading data from the specific memory location and providing the data that was read from the specific memory location.

Embodiments include secure AWCD and PWCD communications that do not require password protection or data encryption. Embodiments can provide simpler security techniques than prior solutions. Embodiment can require less computation than prior solutions while providing offline authentication, such as in an anti-counterfeiting application. The identifier and/or key can help obfuscate and/or "hide the data in plain sight". Security by obfuscation can help provide a balance between computation constraints and level of security.

FIG. 1 illustrates, by way of example, a schematic diagram of an embodiment of a wireless authentication system 100. The system 100 as illustrated includes an AWCD 101, an optional controller device 120, and a PWCD 150 communicatively coupled (as indicated by communication link 130 and communication link 140). The PWCD 150 as illustrated is situated on an optional patch 180 by an optional attachment mechanism 170. The AWCD 101 is illustrated as being situated on an optional electronic device 190 (e.g., a wearable or non-wearable device). The patch 180 may be worn, such as by making direct contact with a surface of a body. The patch may be worn indirectly, such as by attaching the patch 180 to the electronic device 190 (through the attachment mechanism(s) 175 and/or 185), and physically connecting the electronic device 190 to the body.

The AWCD 101 can include an RFID, NFC, BLE, or other device reader. An active device reader transmits interrogator signals to the PWCD and receives responses to the interrogator signals from the PWCD. The AWCD 101 can be configured to operate in a frequency range for RFID, NFC, Bluetooth, or the like. The AWCD 101 as illustrated includes processing circuitry 102, antenna(s) 104, power circuitry 106, and a memory 108.

The processing circuitry 102 can be configured to perform operations of an active reader. The operations performed by the processing circuitry 102 can include modulating data onto a carrier signal to be transmitted by the antenna(s) 104 (e.g., to the PWCD 150 or the controller device 120), demodulating an electromagnetic wave incident on the antenna(s) 104 (e.g., from the PWCD 150 and/or the controller device 120), altering a request for data from the PWCD 150 or controller device 120 into a format compatible with the PWCD 150 or controller device, respectively, interpreting a response from the PWCD 150 into a format compatible with the controller device 120, determining an organization of a memory 158 of the PWCD 150 (e.g., using the lookup table (LUT) 112, an identifier 160, and/or key(s) 110), formatting a request to write data or read data from the memory 158 based on the determined organization, and/or determine a process of a plurality of processes to be used to determine the memory organization, a password of the PWCD 150, and/or an encryption/decryption technique (sometimes called a process or a method) and/or key.

The processing circuitry 102 can include one or more processing units (e.g., a central processing unit or other hardware processor, field programmable gate array (FPGA), system on a chip (SoC), or the like) and/or one or more electric or electronic components electrically coupled to perform operations of the AWCD 101. The electric or electronic components can include one or more transistors, resistors, capacitors, inductors, modulators, demodulators, oscillators, phase locked loops, rectifiers, voltage and/or current regulators, logic gates (e.g., AND, OR, inverter, NAND, NOR, XOR, or the like), diodes, analog to digital converters, digital to analog converters, multiplexers, buffers, amplifiers, or the like.

The antenna(s) 104 convert electromagnetic waves to electrical signals or vice versa. The antenna(s) 104 can include a coil (e.g., a conductive element with one or more complete turns), a loop, a dipole, a slot, or the like. The antenna(s) 104 can receive electromagnetic waves from the PWCD 150 and convert the electromagnetic waves to electrical signals. The antenna(s) 104 can receive electrical signals from the processing circuitry 102 and produce electromagnetic waves. The electromagnetic waves can be of a frequency compatible with the antenna(s) 154.

The power circuitry 106 can provide power to the processing circuitry 102 and the memory 108. The power circuitry 106 can include a battery, power supply, such as can be plugged into a power outlet, or the like. The power circuitry 106 makes the AWCD 101 active, rather than passive.

The memory 108 as illustrated includes one or more key(s) 110, a LUT 112, and an access password stored thereon. The key(s) 110 represent alphanumeric values. The key(s) 110 can be used, by the processing circuitry 102, in determining an organization of the memory 158, a process to be used in determining the organization of the memory 158, a password of the PWCD 150, a process to be used in determining a password of the PWCD 150, an encryption/decryption technique or key(s), or the like. The key(s) 110 can be secure, such as to be accessible only by entities with proper credentials, such as an entity with a specified signature, password, location, or the like.

The LUT 112 includes data detailing one or more of an identifier of the PWCD 150, a key of the key(s) 110, a combination of the identifier and the key(s) 110, and a corresponding memory location of data in the memory 158. The LUT 112 can be indexed by identifier, key(s) 110, or a combination of the identifier and the key(s) 110. The combination of the identifier and the key(s) 110 can include a mathematical or appended combination of at least a portion of the identifier and the key(s) 110. The mathematical combination can include a hash value produced based on the identifier and/or the key(s) 110. The hash value can be perfect, uniformly distributed, other distributions, or the like. The mathematical combination can include multiplication, addition, subtraction, division, projection, or other function on one or more of the identifier and/or key(s).

The access password 114 can include alphanumeric characters or other binary string, which can be required by the memory 158 to access data 162 and or an identifier 160 thereon.

The communication link 130 is a wired or wireless coupling between the AWCD 101 and the PWCD 150. The communication link 130 can include a radio frequency (RF), Bluetooth, NFC, or other frequency range.

The controller device 120 is optional. The controller device 120 provides commands to the AWCD 101, such as to cause the AWCD 101 to perform operations desired by the controller device 120. In one or more embodiments, the controller device 120 and the AWCD 101 can be incorporated into a same device, such as the electronic device 190. The controller device 120 as illustrated includes processing circuitry 122, antenna(s) 124, power circuitry 126, and a memory 128.

The processing circuitry 122 can be configured to perform operations of the controller device 120. The operations of the controller device 120 can include one or more of: (a) generating a request to write data to the PWCD 150, (b) generating a request to read data from the PWCD 150, (c) generating random, pseudo-random, or other data to be written to the PWCD 150, (d) interpreting a response provided by the AWCD 101, (e) generating a wakeup signal to be provided to the AWCD 101, and/or (f) generating a sleep signal to be provided to the AWCD 101, among other operations.

The antenna(s) 124 convert electromagnetic waves to electrical signals or vice versa. The antenna(s) 124 can include a configuration similar to those described regarding the antenna(s) 104.

The power circuitry 126 can provide power to the processing circuitry 122 and the memory 128. The power circuitry 126 can include one or more components similar to those discussed with regard to the power circuitry 106.

The memory 128 includes data stored thereon that can be accessible by the processing circuitry 122. In one or more embodiments, the memory 128 includes data stored thereon to be written to (after or before encryption) the memory 158 of the PWCD 150.

The PWCD 150 can include an RFID, NFC, BLE, or other device tag. A passive tag harvests power from electromagnetic waves incident on an antenna 154 thereof and responds to requests for data from the AWCD 101. The PWCD 150 can be configured to operate in a frequency range for RFID, NFC, Bluetooth, or the like. The PWCD 150 as illustrated includes processing circuitry 152, antenna(s) 154, harvesting circuitry 156, and a memory 158.

The processing circuitry 152 can be configured to perform operations of a passive tag. The operations performed by the processing circuitry 152 can include modulating data onto a carrier signal to be transmitted by the antenna(s) 154, demodulating an electromagnetic wave incident on the antenna(s) 154 (e.g., from the AWCD 101), determining a response to a request for data from the AWCD 101, and/or altering data to be provided to the AWCD 101 into a format compatible with the AWCD 101. The processing circuitry 152 can include components similar to those described about the processing circuitry 102.

The antenna(s) 154 convert electromagnetic waves to electrical signals or vice versa. The antenna(s) 154 can include a configuration similar to those described about the antenna(s) 104.

The harvesting circuitry 156 can convert electromagnetic waves incident on the antenna(s) 154 to electrical power. The electrical power can be used to power the processing circuitry 152 and the memory 158. The harvesting circuitry 156 can include non-radiative components (e.g., coils in an inductive coupling), such as in NFC or near-field wireless power transfer, resonant inductive components, such as in RF or Bluetooth or NFC, capacitive coupling, such as to charge a battery by wireless power transfer, or radiative components, such as in far-field applications. The harvesting circuitry 156 can include one or more capacitors or batteries to store electrical energy produced by the harvesting circuitry 156. The harvesting circuitry 156 makes the PWCD 150 active, rather than passive.

The memory 158 as illustrated includes one or more identifier(s) 160 and other data 162 stored thereon. The identifier(s) 160 represent alphanumeric values. The identifier(s) 160 can be used, by the processing circuitry 102, in determining an organization of the memory 158, a process to be used in determining the organization of the memory 158, a password of the PWCD 150, a process to be used in determining a password of the PWCD 150, an encryption/decryption technique or encryption/decryption key(s), or the like. The identifier(s) 160 can be secure, such as to be accessible only by entities with proper credentials, such as an entity with a specified signature, password, location, or the like.

The data 162 can include an indication of usage of an object to which the PWCD 150 is attached or associated with. The data 162 can include random data or other data provided by the AWCD 101.

The tamper circuitry 164 can help provide protection from altering data of the memory 158 and/or help ensure that the PWCD 150 or patch 180 is used only a number of times (e.g., one, two, three, four, five, etc.). The tamper circuitry 164 can help avoid counterfeiting or malicious attack on the PWCD 150 and/or AWCD 101. In one or more embodiments, the tamper circuitry 164 can protect one or more memory locations of the memory 158, such as by providing an "OR" function for data to be written to the memory location and data already written to the memory location. For example, the tamper circuitry 164 can "OR" a word "10101010" to be written and a word "11001100" already written to cause a word "11101110" to be written the memory location. Such tamper circuitry can help the AWCD 101 detect when the memory has been altered, such as to help detect tampering or other malicious activity. In one or more embodiments, the tamper circuitry 164 can include a conductive element (e.g., a wire, trace, or the like) that, when broken, alters data written to one or more memory locations of the memory 158. The tamper circuitry 164 can include a multiplexer, logic gate, or the like, that produces a first value while the conductive element remains unbroken and a different, second value while the conductive element is broken.

The attachment mechanism 170 mechanically couples the PWCD 150 to the patch 180. The attachment mechanism 170 can include an adhesive, hook and loop fastener, button, snap, magnet, or the like. The attachment mechanism 170 can be coupled with a mating attachment mechanism of the patch 180 (not in view in FIG. 1), in one or more embodiments. The attachment mechanism 170 and mating attachment mechanism can be conductive, such that, when connected, provide a current path between components of the patch 180 and the PWCD 150.

The patch 180 includes a flexible (e.g., rotatable about an axis) and/or stretchable (e.g., capable of elongation) layer (e.g., a fabric, woven cloth, film, foil, non-woven cloth, or the like). The patch 180 can conform to a surface to which the patch 180 is to be attached. The patch 180 can include circuitry 182. The circuitry 182 can include one or more sensors, electrodes, or other circuitry thereon or at least partially therein. The patch 180 can include a conformable electrode, a fluid detection or measurement device, one or more light emitting diodes, optical sensors, inertial sensors (e.g., an accelerometer), chemical sensors (e.g., to sense an electrolyte, lactic acid, or other chemical sensor), thermal sensors (e.g., a heater and temperature sensor), impedance sensors (e.g., a voltage or current source at some frequency with a current or voltage measurement), displacement sensors (e.g., a resistive strain gauge, an eddy current sensor), pressure sensors, or other circuitry. A conformable electrode is a flexible and/or stretchable conductive material to provide electrical current to an object to which the patch 180 is physically connected. A fluid detection device can determine whether fluid is present, absent, an amount of moisture, whether the amount of fluid is increasing or decreasing, or the like. The fluid detection device can determine a fluid content of an object with which the patch 180 is in physical contact. In one or more embodiments, the patch 180 can include a moisture wicking material.

The attachment mechanism 175 can be similar to the attachment mechanism 170, with the attachment mechanism 175 physically connecting the patch 180 to the electronic device 190 or to a body. The attachment mechanism 175 can be coupled with a mating attachment mechanism 185 of the electronic device 190, in one or more embodiments. The mating attachment mechanism 185 can include a male or female connection feature if the attachment mechanism 175 is a female or male attachment mechanism, respectively. The attachment mechanism 175 and mating attachment mechanism 185 can be conductive, such that, when connected, provide a current path between components of the AWCD 101 and the PWCD 150.

Figure 2B:
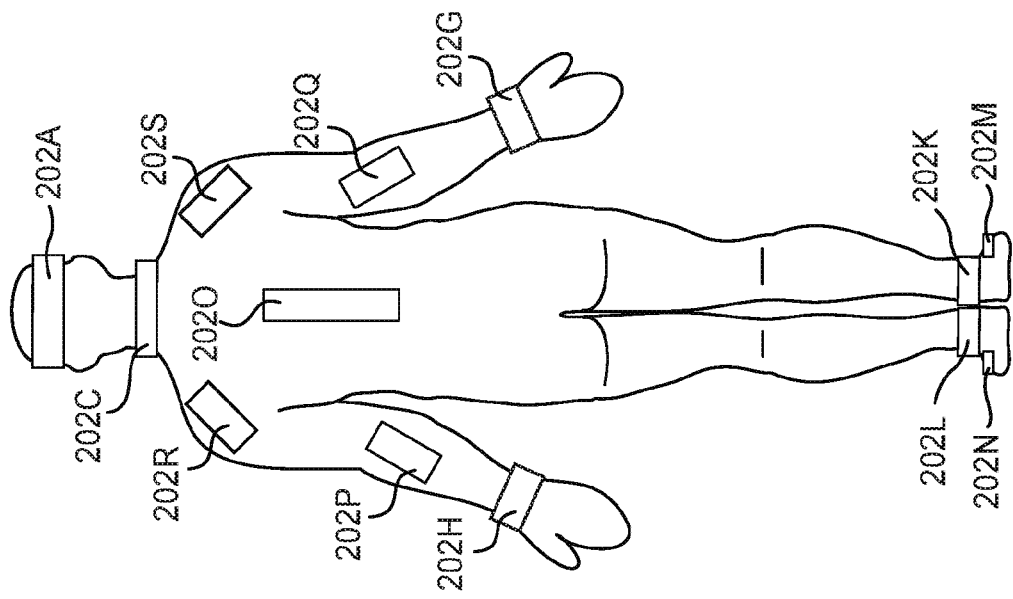
FIG. 2B illustrates, by way of example, a perspective view diagram of an embodiment of a passive and/or active wireless communication device physically connected to a back of a body.
Figure 2A:
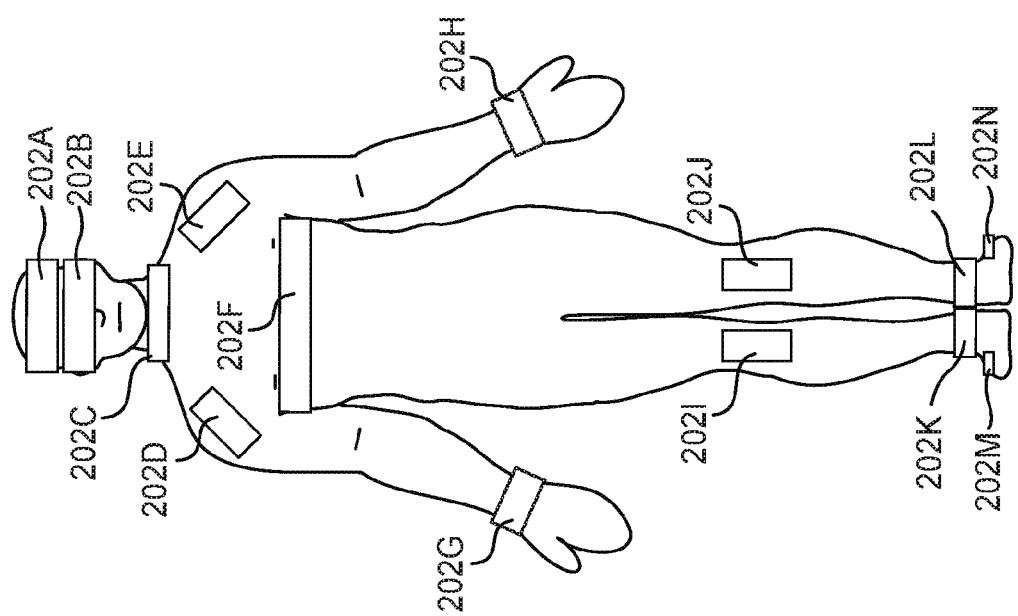
FIG. 2A illustrates, by way of example, a perspective view diagram of an embodiment of passive and/or active wireless communication device physically connected to a front of a body.

The electronic device 190 can include a flexible and/or stretchable layer. The electronic device 190 can be configured to be placed at a specific place on a body, such as on a head (e.g., as a head band, bandana, ear muffs, glasses, headphones, or the like), a wrist (e.g., as a wristband, a watch, a bracelet, or the like), a hand (e.g., as a ring, glove, or the like), a neck (e.g., as a necklace or the like), an ankle (e.g., as an ankle bracelet or the like), chest (e.g., as a chest strap or the like), foot (e.g., as a foot band or the like), waist (e.g., as a belt, wrap, or the like). FIGS. 2A and 2B illustrate some locations at which the patch 180 and/or electronic device 190 may be situated or cover.

The attachment mechanism 195 can be similar to the attachment mechanism 170, with the attachment mechanism 195 physically connecting the AWCD 101 to the electronic device 190. The attachment mechanism 195 can be coupled with a mating attachment mechanism of the patch electronic device 190 (not in view in FIG. 1), in one or more embodiments.

FIG. 2A illustrates, by way of example, a perspective view diagram of an embodiment of a patch and/or wearable electronic device physically connected to a front side of a body. The diagram includes a human body with a device 202A, 202B, 202C, 202D, 202E, 202F, 202G, 202H, 202I, 202J, 202K, 202L, 202M, and 202N situated at various locations on the front side of the human body. The device 202A-202N can include the patch 180 and/or the electronic device 190. The locations of the device 202A-202N include: (a) on or around the head (e.g., the device 202A on the forehead and the device 202B on the face, such as can include glasses), (b) on or around the neck (e.g., the device 202C, such as can include a necklace), (c) on or around the shoulder (e.g., the devices 202D-202E), (d) on or around the chest, such as over the heart, lungs, or other organ (e.g., the device 202F), (e) on or around a wrist or hand (e.g., the devices 202G-202H, such as a watch or bracelet or glove or ring), (f) on or around a knee (e.g., the devices 202I-202J, such as a knee brace), (g) on or around an ankle or foot (e.g., the devices 202K-202N, such as an ankle bracelet, socks, gaiters, or the like).

FIG. 2B illustrates, by way of example, a perspective view diagram of an embodiment of a patch and/or wearable electronic device physically connected to a backside of a body. The diagram includes a human body with a device 202A, 202C, 202G, 202H, 202K, 202L, 202M, 202N, 202O, 202P, 202Q, 202R, and 202S situated at various locations on the backside of the human body. The device 202A-202S can include the patch 180 and/or the electronic device 190. The locations of the device 202O-202S include: (a) on or around the back (e.g., the device 202O on the back, such as over the lungs or other organ), (b) on or around the elbow (e.g., the device 202P-202Q, such as can include an arm band, arm warmer, or the like), and (c) on or around the shoulder (e.g., the devices 202R-202S).

Figure 3:
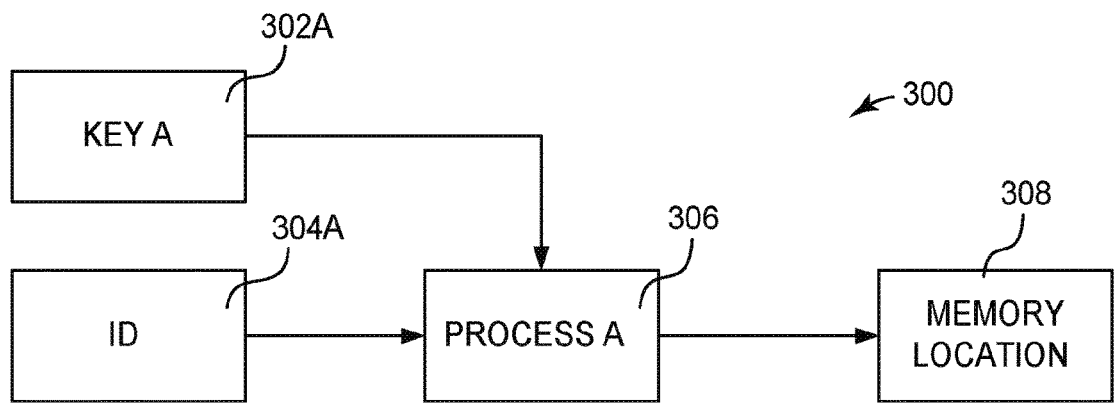
FIG. 3 illustrates, by way of example, a diagram of an embodiment of a process for securely determining a memory location of a memory.

FIG. 3 illustrates, by way of example, a diagram of an embodiment of a technique 300 for securely determining, by the AWCD 101, a memory location of a memory, such as the memory 158. The technique 300, as illustrated, includes retrieving or identifying a key at operation 302A, such as can be stored in the memory 108 as a key of the key(s) 110. The key can be a secret key, such that only the AWCD 101 knows the key exists, where the key is located, and/or which process(es) use the key as input. The technique 300, as illustrated, further includes retrieving an identifier at operation 304A, such as from the PWCD 150. The identifier can include an identifier of the identifier(s) 160. The identifier can be retrieved by issuing a request, from the AWCD 101, to the PWCD 150. The technique 300 as illustrated, further includes using the key and the identifier in a process at operation 306. The process can be performed by the AWCD 101, to determine an organization of the memory 158 of the PWCD 150. The operation 306 can include using a cryptographic or non-cryptographic process. The process can include using the key and/or identifier, alone or in combination (e.g., by determining a value based on the key and identifier, such as by appending key and identifier, hashing some mathematical combination of the key and/or identifier to another value, or the like), to determine a value that can be used to determine an organization of data stored on the memory 158. The value can be an index to a LUT that details addresses of the memory 158 and a description of the data stored at respective addresses. In one or more embodiments, portions of single item of data in the memory 158 can be stored in non-sequential addresses (e.g., stored in multiple separated blocks in the memory 158). The technique 300 as illustrated further includes, identifying a memory location of the memory 158 based on the determined memory organization, at operation 308. The determined memory location, at operation 308, can be used by the AWCD 101 to retrieve desired data from the PWCD 150.

The technique 300 allows for flexibility in organizing the memory 158 and/or design of the AWCD 101. The flexibility in organizing the memory 158 can help provide data obfuscation, as the memory 158 is not constrained to a specific organization. An AWCD reading data from the PWCD 150 will only understand the data being provided by the PWCD 150 if the AWCD knows the key and/or identifier and the memory organization.

Figure 4:
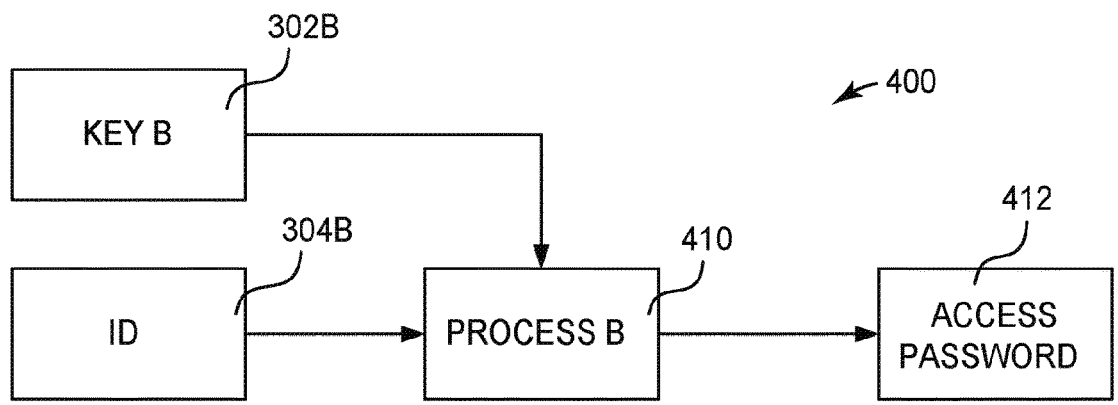
FIG. 4 illustrates, by way of example, a diagram of an embodiment of a process for securely determining an access password.

FIG. 4 illustrates, by way of example, a diagram of an embodiment of a technique 400 for securely determining an access password. The technique 400 is similar to the technique 300, with the key identified or retrieved at operation 302B being a same or different key as the key identified or retrieved at operation 302A, the identifier identified or retrieved at operation 304B being a same or different identifier as the identifier identified at operation 304A. The identified or retrieved key and/or identifier, from operations 302B and 304B, can be used in a process at operation 410. The process can be performed by the AWCD 101, to determine an access password of the memory 158 of the PWCD 150. The operation 410 can include using a cryptographic or non-cryptographic process. The process can include using the key and/or identifier, alone or in combination to determine a value that can be used to determine a location at which the access password is stored on the memory 108. The value can be an index to a LUT that details addresses of the memory 108 and a description of the data stored at respective addresses. The technique 400 as illustrated further includes, identifying or retrieving the access password at operation 412. The access password can be used in a request, from the AWCD 101, to the PWCD 150, such as to retrieve data from the memory 158 that requires the access password.

Figure 5:
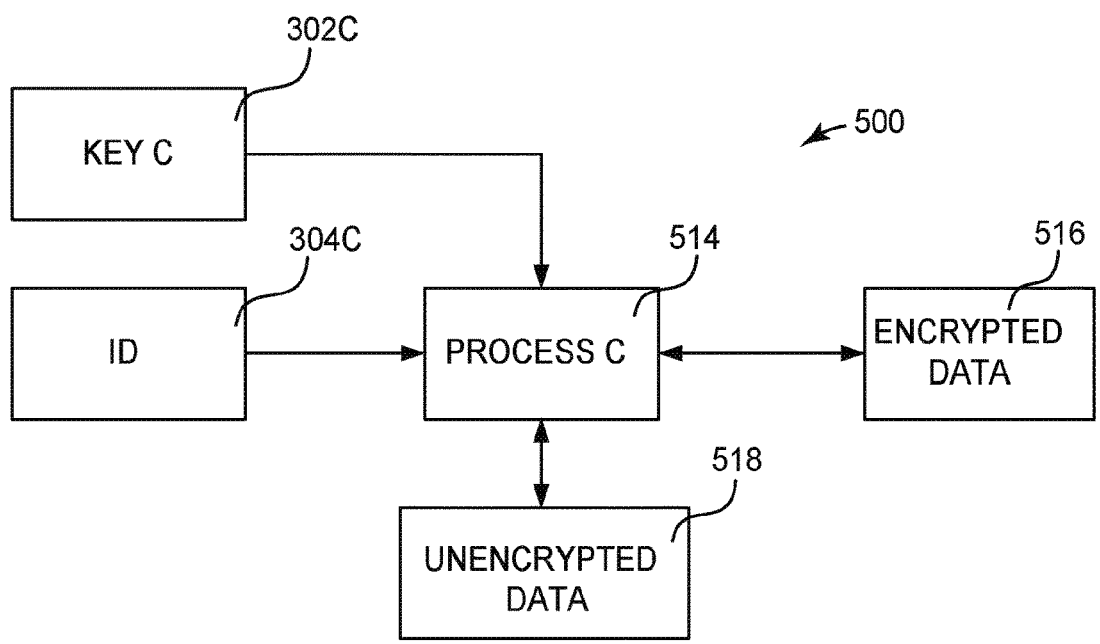
FIG. 5 illustrates, by way of example, a diagram of an embodiment of a process for providing encrypted data to a device or providing decrypted data to a device.

FIG. 5 illustrates, by way of example, a diagram of an embodiment of a technique for providing encrypted data to a device or providing decrypted data to a device. The technique 500 is similar to the techniques 300 and 400, with the key identified or retrieved at operation 302C being a same or different key as the key identified or retrieved at operations 302A-302B, the identifier identified or retrieved at operation 304C being a same or different identifier as the identifier identified at operations 304A-304B. The identified or retrieved key and/or identifier, from operations 302C and 304C, can be used in a process at operation 514. The process can be performed by the AWCD 101, to determine an encryption/decryption key to be used in performing the encryption/decryption. The operation 514 can include using a cryptographic or non-cryptographic process. The process can include using the key and/or identifier, alone or in combination, to determine a value that can be used to determine the key. The value can be an index to a LUT that details encryption/decryption keys. The technique 500 as illustrated further includes, retrieving encrypted data from the PWCD 150 or encrypting unencrypted data and writing the data to the PWCD 150 at operation 516. The encrypted data may or may not be protected by an access password, such as can be determined using the technique 400. The encrypted data can be located at a memory location determined using the technique 300. The encryption/decryption key determined at operation 514 can be used to decrypt the data and produce unencrypted data at operation 518.

Figure 6:
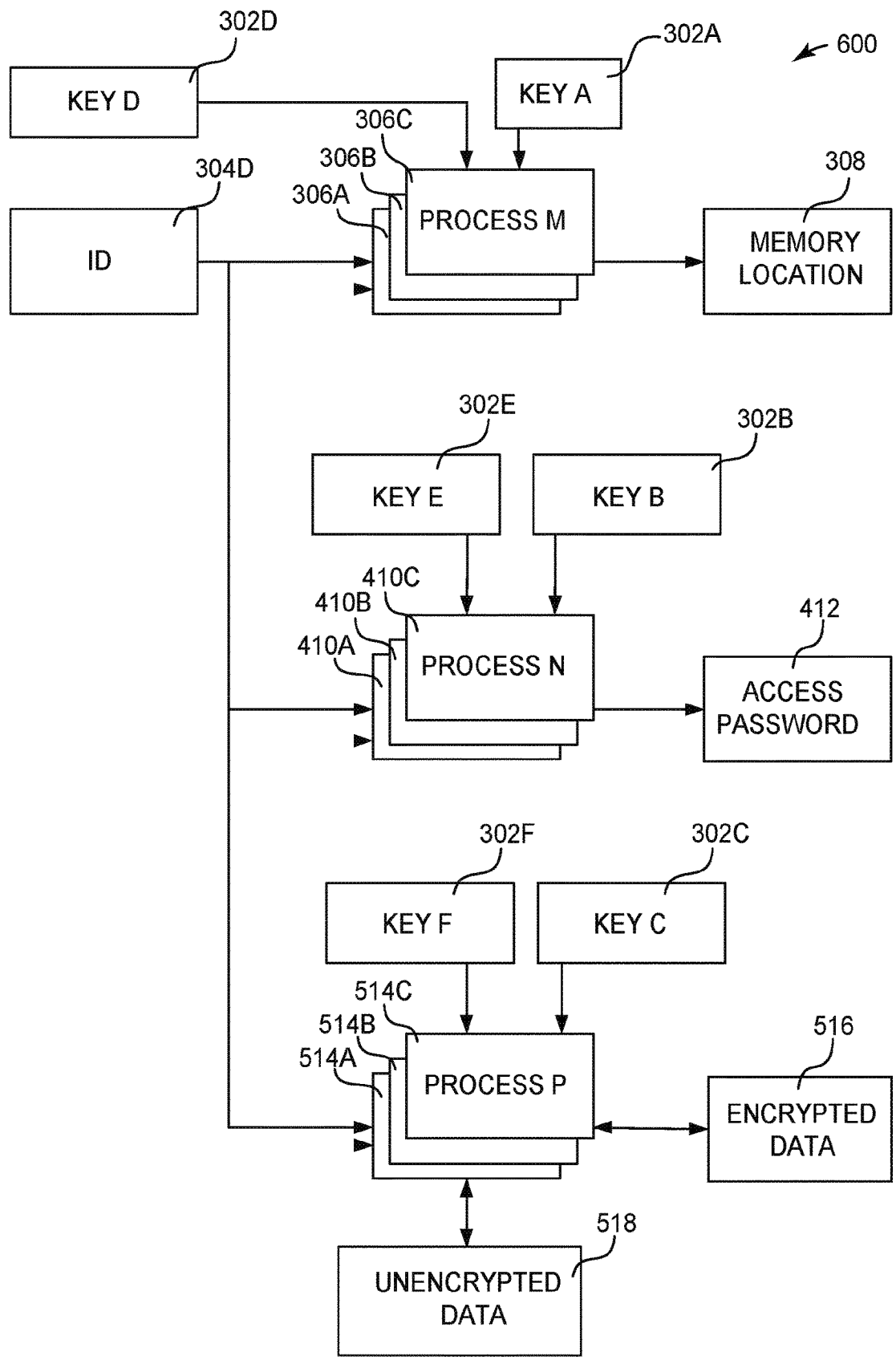
FIG. 6 illustrates, by way of example, a diagram of an embodiment of processes for determining a process for determining a memory location, access password, encrypted data, and decrypted data, respectively.

FIG. 6 illustrates, by way of example, a diagram of an embodiment of techniques 600 for determining a technique for determining a memory location, access password, encrypted data, and decrypted data, respectively. The technique 600 is similar to a combination of the techniques 300, 400, and 500, with multiple processes available to determine a memory location at operations 306A, 306B, and 306C, multiple processes available to determine an access password at operations 410A, 410B, and 410C, and multiple processes available to encrypt/decrypt data to/from the PWCD 150 and/or determine a key for the encryption/decryption at operations 514A, 514B, and 514C. The technique 600 illustrates that the techniques 300, 400, and/or 500 can be used alone or in combination.

The operations 302D, 302A, 304D, 306A-306C, and 308 can be similar to or the same as the operations discussed about the technique 300, with the operations of the technique 600 including a choice between the operations 306A-306C. Each of the operations 306A-306C include different processes for determining the memory location. For example, a first process can include using just the key to determine the memory location, a second process can include using just the identifier to determine the memory location, and a third process can include using a combination of the key and the identifier to determine the memory location. In another example, a first process can include using at least a portion of the key and/or at least a portion of the identifier to determine the memory location, a second process can include using at least a different portion of a same or different key and/or at least a same or different portion of the identifier to determine the memory location, and a third process can include using at least a further different portion of a same or a different key and/or at least a further same or different portion of the identifier to determine the memory location. The operation of the operations 306A-306C to use to determine the memory location can be chosen by using one or more of the process selection key (e.g., the key identified or determined at operation 302D), the identifier (e.g., the identifier identified or determined at operation 304D), and a combination of the process selection key and identifier to determine the operation. One or more of the processes can include hashing, using a hash function, one or more of process input key(s) (e.g., the key identified or determined at operation 302A), the identifier, or a combination thereof and using a result of the hashing as an index to a LUT or the like. In another example, each of the operations 306A-306C can perform different hash functions, such as to produce different results for the same input. The operations 306A-306C represent any number of choices of operations. For example, there can be 10 different operations to choose from, 100 different operations to choose from, or 1 million different operations to choose from, fewer operations to choose from, more operations to choose from, or some number of operations therebetween.

The operations 302E, 302B, 304D, 410A, 410B, and 410C, and 412 can be similar to or the same as the operations discussed regarding the technique 400, with the operations of the technique 600 including a choice between the operations 410A-410C. Each of the operations 410A-410C include different processes for determining the access password. For example, a first process can include using just the key to determine the access password, a second process can include using just the identifier to determine the access password, and a third process can include using a combination of the key and the identifier to determine the access password. In another example, a first process can include using at least a portion of the key and/or at least a portion of the identifier to determine the access password, a second process can include using at least a same or different portion of the same or a different key and/or at least a same or different portion of the identifier to determine the access password, and a third process can include using at least a same or a further different portion of the same or a different key and/or at least a same or a further different portion of the identifier to determine the access password. The operation of the operations 410A-410C to use in determining the access password can be chosen by using a process selection key (e.g., the key identified or determined at operation 302E), the identifier (e.g., the identifier identified or determined at operation 304D), and a combination of the process selection key and identifier to determine the operation. One or more of the processes can include hashing, using a hash function, one or more process input key(s) (e.g., the key identified or determined at operation 302B), the identifier, or a combination thereof and using a result of the hashing as an index to a LUT or the like. In another example, each of the operations 410A-410C can perform different hash functions, such as to produce different results for the same input. The operations 410A-410C represent any number of choices of operations. For example, there can be 10 different operations to choose from, 100 different operations to choose from, or 1 million different operations to choose from, fewer operations to choose from, more operations to choose from, or some number of operations therebetween.

The operations 302F, 302C, 304D, 514A, 514B, 514C, 516, and 518 can be similar to or the same as the operations discussed regarding the technique 500, with the operations of the technique 600 including a choice between the operations 514A-514C. Each of the operations 514A-514C include different processes and/or encryption key(s) for encryption/decryption. For example, a first process can include using just the key to determine the encryption/decryption key(s) and/or encryption/decryption process, a second process can include using just the identifier to determine encryption/decryption key(s) and/or encryption/decryption process, and a third process can include using a combination of the key and the identifier to determine encryption/decryption key(s) and/or encryption/decryption process. In another example, a first process can include using at least a portion of the key and/or at least a portion of the identifier to determine the encryption/decryption key(s) and/or encryption/decryption process, a second process can include using at least a same or different portion of the same or a different key and/or at least a same or different portion of the identifier to determine the encryption/decryption key(s) and/or encryption/decryption process, and a third process can include using at least a same or a further different portion of the same or a different key and/or at least a same or a further different portion of the identifier to determine the encryption/decryption key(s) and/or encryption/decryption process. The operation of the operations 514A-514C to use in determining the encryption key(s) and/or encryption/decryption process can be chosen by using one or more of the process selection key (e.g., the key identified or determined at operation 302F), the identifier (e.g., the identifier identified or determined at operation 304D), and a combination of the process selection key and identifier. One or more of the processes can include hashing, using a hash function, one or more process input key(s) (e.g., the key identified or determined at operation 302C), the identifier, or a combination thereof and using a result of the hashing as an index to a LUT or the like. The LUT can be indexed by hash value and include entries detailing a process to be performed for a given hash value. In another example, each of the operations 514A-514C can include performing different hash functions, such as to produce different results for the same input. The operations 514A-514C represent any number of choices of operations. For example, there can be 10 different operations to choose from, 100 different operations to choose from, or 1 million different operations to choose from, fewer operations to choose from, more operations to choose from, or some number of operations therebetween.

Figure 7:
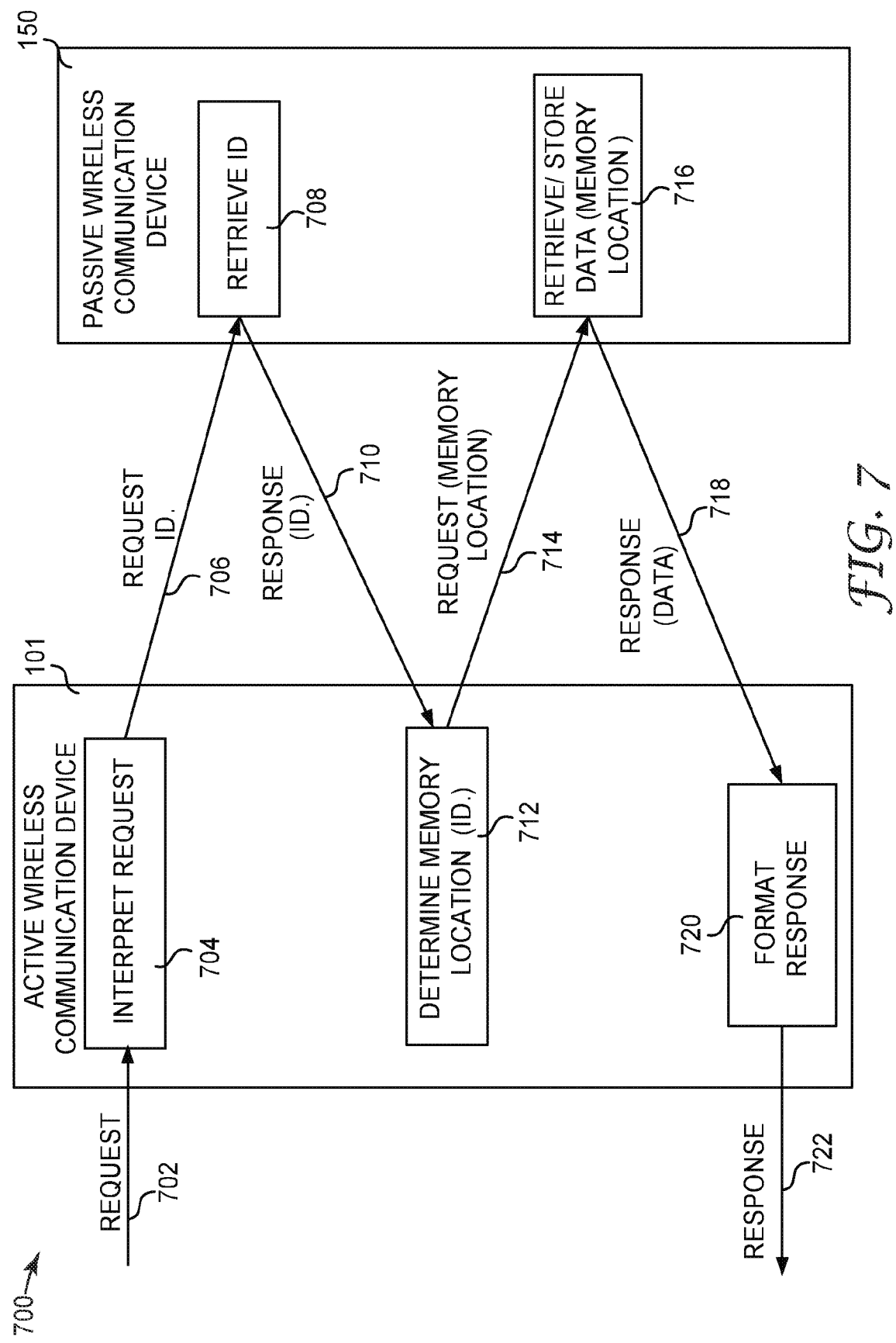
FIG. 7 illustrates, by way of example, a diagram of an embodiment of communications to/from a wireless authentication system

FIG. 7 illustrates, by way of example, a diagram of an embodiment of communications 700 to/from a wireless authentication system. The communications 700 can be issued in performing the technique 300 or a portion of the technique 600. The communications 700 as illustrated include a request 702 received at the AWCD 101 and from the controller device 120. The request 702 can include data specifying information to be read from or written to the PWCD 150. Request 702 can include a query for verifying authenticity or usage. The AWCD 101 can interpret the request at operation 704. The operation 704 can include determining a PWCD to interrogate and what information is required to fulfill the request 702. The AWCD 101 can issue an identifier request 706, such as in response to receiving the request 702. The identifier request 706 can include data identifying a PWCD 150 and/or data requested from the PWCD 150. The data requested can be the identifier(s) 160.

At operation 708, the PWCD 150 can retrieve the requested identifier(s) 160. The PWCD 150 can provide the identifier in a response 710. The response 710 can identify the PWCD 150 and/or the identifier(s) 160 retrieved at operation 708. The AWCD 101, at operation 712, can determine a memory location of the memory 158 at which information requested in the request 702 is located based on the identifier provided in the response 710. In some embodiments, the operation 712 includes using a key of the key(s) 110 along with the identifier to determine the memory location. As previously discussed, the memory location can be determined by using the key, identifier, a combination thereof, or a number derived using one or more the key and identifier, as an index to a LUT detailing memory organization(s). Based on the memory organization, the AWCD 101 can issue a request 714 to read or write data to a specific memory location, such as to satisfy the request 702.

At operation 716, the PWCD 150 can retrieve data from (or write data to) the memory location identified in the request 714. The operation 716 can be performed in response to receiving the request 714. The PWCD 150 can issue a response 718 with data from the memory location identified in the request 714 (in instances in which the request is a read request) or with an acknowledge or a negative acknowledge (in instances in which the request is a write request). An acknowledge (sometimes called an ACK) indicates that a write was successful while a negative acknowledge (sometimes called a NACK) indicates that a write was unsuccessful. At operation 720, the AWCD 101 can format a response to the request 702. The formatted response can be provided to the controller device 120 as a response 722. The response 722 can be to confirm that the request 702 was fulfilled or indicate that the request 702 is unfulfilled. The response 722 can include data indicating one or more reasons that the request is unfulfilled, such as in the form of one or more error codes. The response 722 can include information regarding authenticity or use of the PWCD 150.

Figure 8:
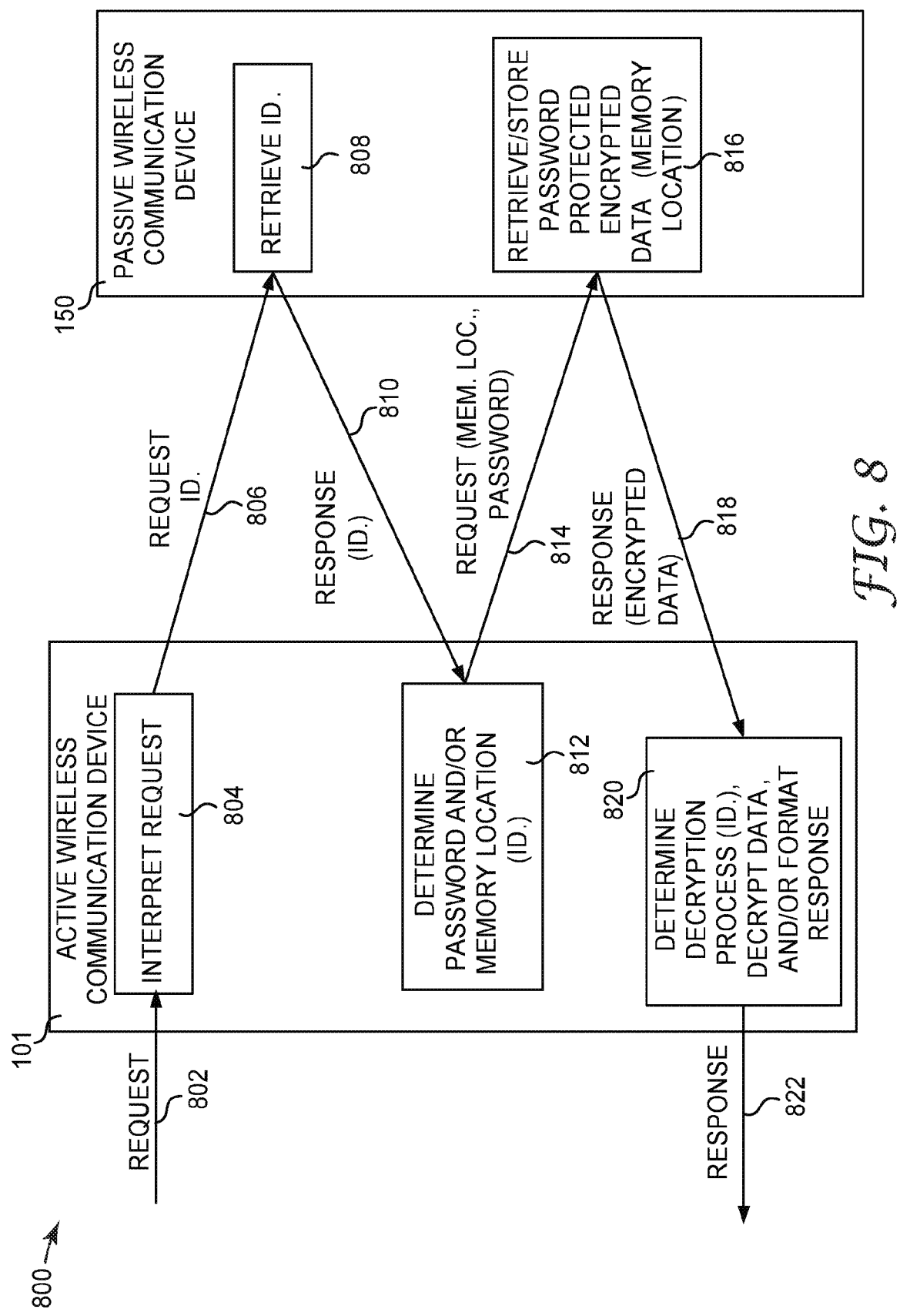
FIG. 8 illustrates, by way of example, a diagram of another embodiment of communications to/from a wireless authentication system.

FIG. 8 illustrates, by way of example, a diagram of an embodiment of communications 800 to/from a wireless authentication system. The communications 800 can be issued in performing the technique 300, 400, 500, and/or at least a portion of the technique 600. The communications 800 as illustrated include a request 802 received at the AWCD 101. In one or more embodiments, the request 802 can be from the controller device 120. The request 802 can include data specifying information to be read from or written to the PWCD 150. Request 802 can include a query for verifying authenticity or usage. The AWCD 101 can interpret the request at operation 804. The operation 804 can include determining a PWCD to interrogate and/or what information is required to fulfill the request 802. The AWCD 101 can issue an identifier request 806. The request 806 can be issued in response to receiving the request 802. The identifier request 806 can include data identifying a PWCD 150 and/or data requested from the PWCD 150. The data requested can be the identifier(s) 160.

At operation 808, the PWCD 150 can retrieve the requested identifier(s). The PWCD 150 can provide the identifier(s) in a response 810. The response 810 can identify the PWCD 150 and/or the identifier(s) retrieved at operation 808. The AWCD 101, at operation 812, can determine a memory location of the memory 158 at which information requested in the request 802 is located based on the identifier provided in the response 810. In some embodiments, the operation 812 includes using a key of the key(s) 110 along with the identifier to determine the memory location. As previously discussed, the memory location can be determined by using the key, identifier, a combination thereof, or a number derived using one or more the key and identifier, as an index to a LUT detailing memory organization(s).

The AWCD 101, at operation 812, can determine an access password of the PWCD 150. The access password can be stored on the memory 108, such as the access password 114. The access password may be password protected, and the key, identifier, a combination thereof, or a number derived from the key and/or identifier may be used to determine the password that provides access to the access password. Based on the memory organization and the access password, the AWCD 101 can issue a request 814 to read or write data to a specific memory location, such as to satisfy the request 802.

At operation 816, the PWCD 150 can retrieve data from (or write data to) the memory location identified in the request 814 (if the access password is correct). The operation 816 can be performed in response to receiving the request 814. The PWCD 150 can issue a response 818 with encrypted data from the memory location identified in the request 814 (in instances in which the request 814 is a read request) or with an acknowledge or a negative acknowledge (in instances in which the request 814 is a write request). At operation 820, the AWCD 101 can format a response to the request 802. The formatted response can be provided to the controller device 120 as a response 822. Formatting the response 822 can include decrypting data received in the response 818. A key and/or a process to be used in decrypting the data in the response 818 can be determined by using the key, identifier, a combination thereof, or a number derived from the key and/or identifier as an index to a LUT which details keys and/or encryption/decryption processes. The response 822 can include information indicating a decrypted version of data read, an encrypted version of the data read, an encryption key to be used to decrypt the data, and/or a process to be used in decrypting the data. The response 822 can be to confirm that the request 802 was fulfilled or indicate that the request 802 is unfulfilled. The response 822 can include data indicating one or more reasons that the request is unfulfilled, such as in the form of one or more error codes. The response 822 can include information regarding authenticity or use of the PWCD 150.

Figure 9:
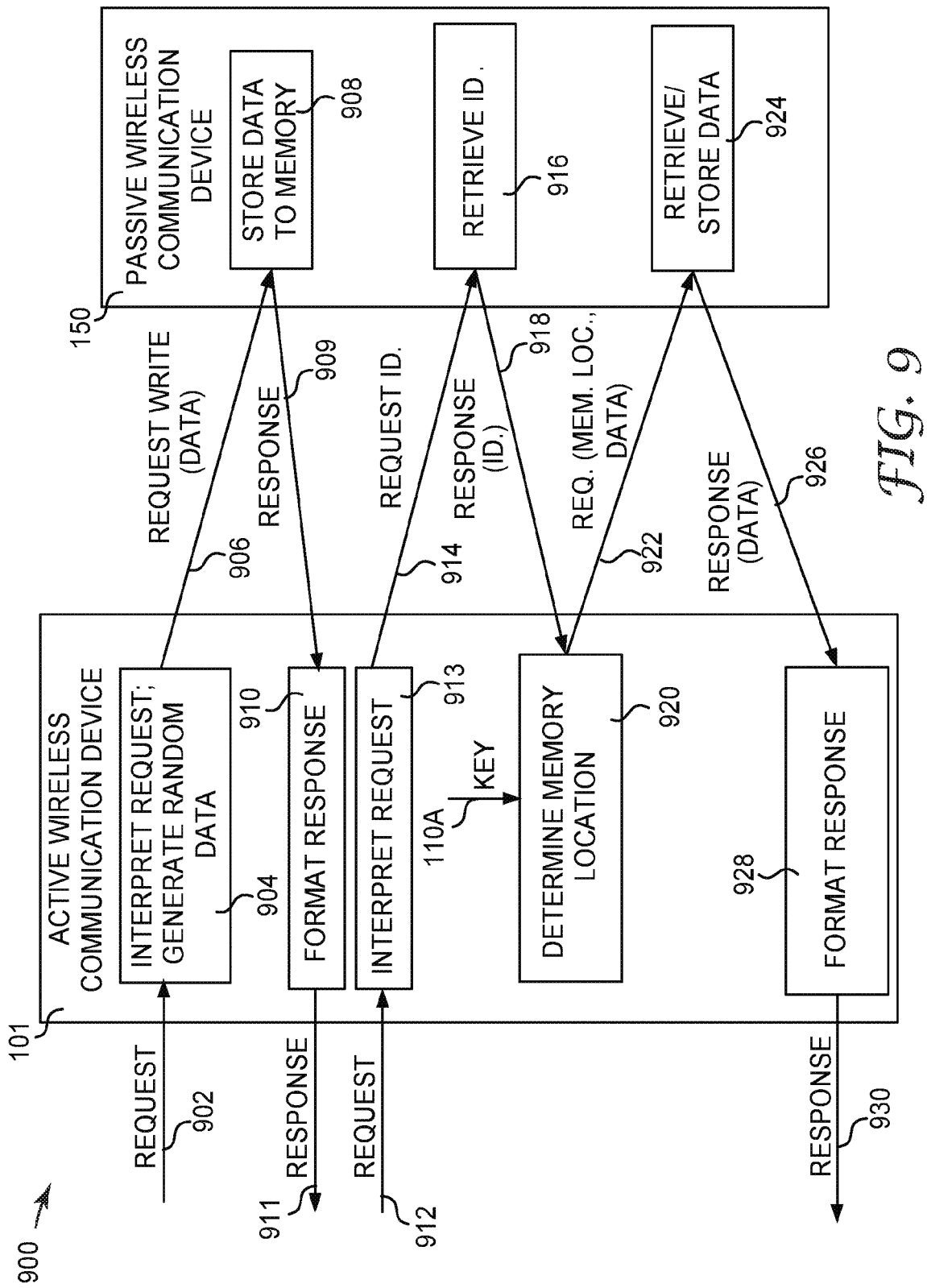
FIG. 9 illustrates, by way of example, a diagram of yet another embodiment of communications to/from a wireless authentication system.

FIG. 9 illustrates, by way of example, a diagram of yet another embodiment of communications 900 to/from a wireless authentication system. The communications 900 can be issued in performing the technique 300, 400, 500, and/or at least a portion of the technique 600. The communications 900 as illustrated include a request 902 received at the AWCD 101. In one or more embodiments, the request 902 can be from the controller device 120. The request 902 can include data specifying information to be read written to the PWCD 150. Request 902 can include a query for verifying authenticity or usage. The request can include random or pseudo-random data to be written to the memory 158 of the PWCD 150 or can be a request for the AWCD 101 to generate random or pseudo-random data and write the generated data to the PWCD 150. Random or pseudo-random data is distinct from data produced in a cryptographic process in which the original data is recoverable. Random or pseudo-random data herein has no key to recover original data, as the random or pseudo-random data does not represent other data. The random or pseudo-random data is a decoy, such as to help obfuscate data on the memory 158. Processes for generating random data can include sampling noise or an electrical or electric component or the like. Processes for generating pseudo-random data can include using a computer program to generate data that does not conform to a distribution other than a random distribution.

The AWCD 101 can interpret the request at operation 904. The operation 904 can include determining a PWCD to interrogate and/or what information is required to fulfill the request 902. The AWCD 101 can issue a request 906 to populate one or more memory locations of the memory 158 with the random or pseudo-random data. The request 906 can be issued in response to receiving the request 902. The request 906 can include data identifying a PWCD 150 and/or memory location(s) on the PWCD 150 to be populated by the random or pseudo-random data.

At operation 908, the PWCD 150 can store the data in the request 906. The PWCD 150 can provide an ACK or NACK in a response 909. The response 909 can be to confirm that the request 906 was fulfilled or indicate that the request 906 is unfulfilled. The response 909 can include data indicating one or more reasons that the request 906 is unfulfilled, such as in the form of one or more error codes. At operation 910, the AWCD 101 can format a response to the request 902. The formatted response can be provided to the controller device 120 as a response 911. The response 911 can be to confirm that the request 902 was fulfilled or indicate that the request 902 is unfulfilled. The response 911 can include data indicating one or more reasons that the request is unfulfilled, such as in the form of one or more error codes.

The communications 900 as illustrated include a request 912 received at the AWCD 101. In one or more embodiments, the request 912 can be from the controller device 120. The request 912 can include data specifying information to be read from or written to the PWCD 150. Request 912 can include a query for verifying authenticity or usage. The AWCD 101 can interpret the request 912 at operation 913. The operation 913 can include determining a PWCD to interrogate and/or what information is required to fulfill the request 912. The AWCD 101 can issue an identifier request 914. The request 914 can be issued in response to receiving the request 912. The identifier request 914 can include data identifying a PWCD 150 and/or data requested from the PWCD 150. The data requested can be the identifier(s) 160.

At operation 916, the PWCD 150 can retrieve the requested identifier(s). The PWCD 150 can provide the identifier(s) in a response 918. The response 918 can identify the PWCD 150 and/or the identifier(s) retrieved at operation 916. The AWCD 101, at operation 920, can determine a memory location of the memory 158 at which information requested in the request 912 is located based on the identifier provided in the response 918 and/or a key 110A, such as can be stored in the memory 108. In some embodiments, the operation 920 includes using a key 110A of the key(s) 110 along with the identifier to determine the memory location. As previously discussed, the memory location can be determined by using the key, identifier, a combination thereof, or a number derived using one or more the key and identifier, as an index to a LUT detailing memory organization(s). Based on the memory organization, the AWCD 101 can issue a request 922 to read or write data to a specific memory location, such as to satisfy the request 912.

At operation 924, the PWCD 150 can retrieve data from (or write data to) the memory location identified in the request 922. The operation 924 can be performed in response to receiving the request 922. The PWCD 150 can issue a response 926 with data from the memory location identified in the request 922 (in instances in which the request is a read request) or with an acknowledge or a negative acknowledge (in instances in which the request is a write request). An acknowledge (sometimes called an ACK) indicates that a write was successful while a negative acknowledge (sometimes called a NACK) indicates that a write was unsuccessful. At operation 928, the AWCD 101 can format a response to the request 912. The formatted response can be provided to the controller device 120 as a response 930. The response 930 can be to confirm that the request 912 was fulfilled or indicate that the request 912 is unfulfilled. The response 930 can include data indicating one or more reasons that the request is unfulfilled, such as in the form of one or more error codes. The response 930 can include information regarding authenticity or use of the PWCD 150.

Figure 10:
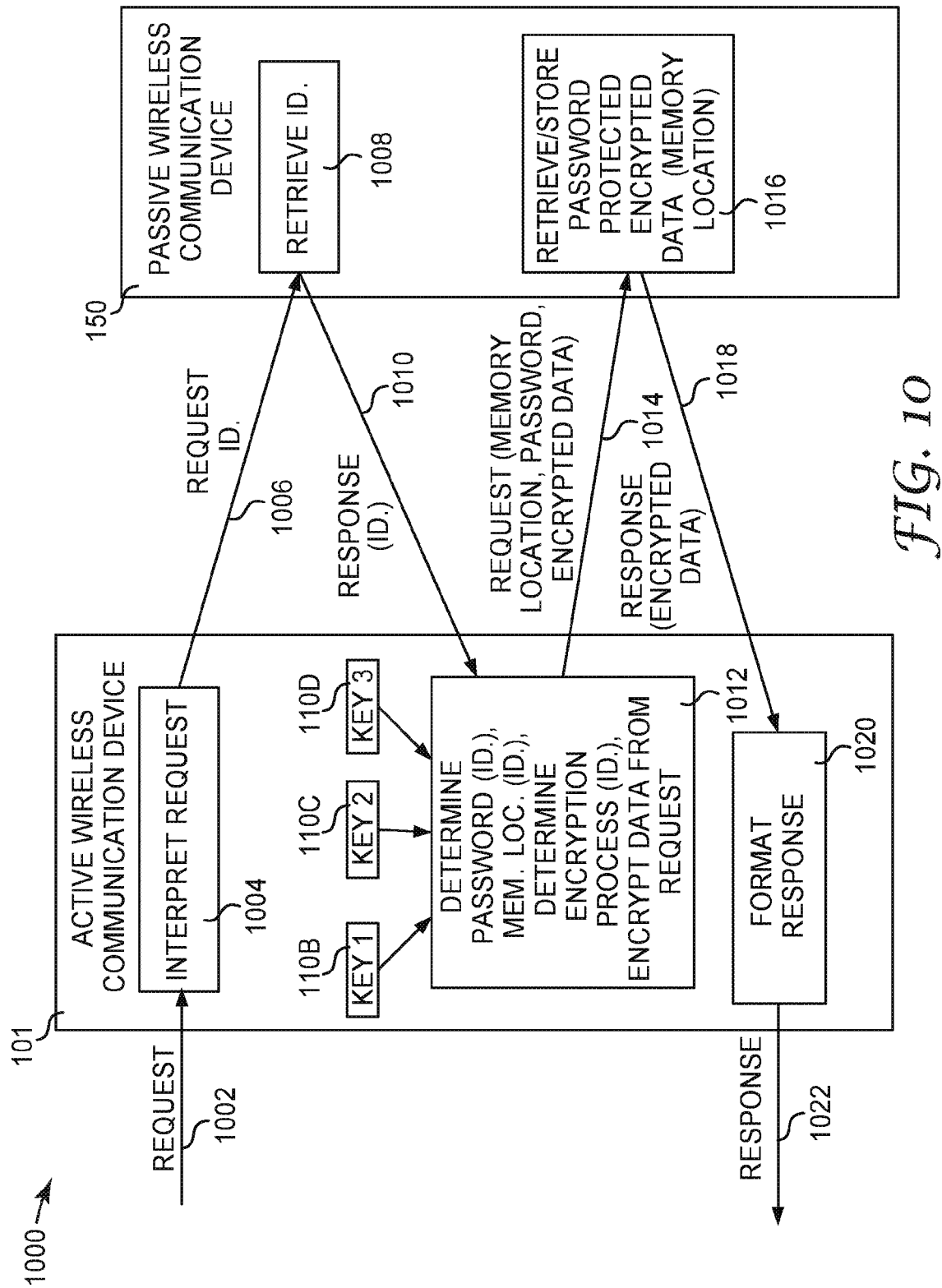
FIG. 10 illustrates, by way of example, a diagram of an embodiment of communications to/from a wireless authentication system.

FIG. 10 illustrates, by way of example, a diagram of an embodiment of communications 1000 to/from a wireless authentication system. The communications 1000 can be issued in performing the technique 300, 400, 500, or at least a portion of the technique 600. The communications 1000 as illustrated include a request 1002 received at the AWCD 101. In one or more embodiments, the request 1002 can be from the controller device 120. In one or more other embodiments, the request 1002 is optional as the AWCD can issue a request 1006 without outside influence. The request 1002 can include data specifying information to be read from or written to the PWCD 150. Request 1002 can include a query for verifying authenticity or usage. The AWCD 101 can interpret the request at operation 1004. The operation 1004 can include determining a PWCD to interrogate and what information is required to fulfill the request 1002. The AWCD 101 can issue an identifier request 1006, such as in response to receiving the request 1002. The identifier request 1006 can include data identifying a PWCD 150 and/or data requested from the PWCD 150. The data requested can be the identifier(s) 160.

At operation 1008, the PWCD 150 can retrieve the requested identifier(s) 160. The PWCD 150 can provide the identifier in a response 1010. The response 1010 can identify the PWCD 150 and/or the identifier(s) 160 retrieved at operation 1008. The AWCD 101, at operation 1012, can determine one or more of: (a) a memory location of the memory 158 at which information requested in the request 1002 is located, (b) an access password required to write data to the PWCD 150 or read data from the PWCD 150, (c) an encryption/decryption process and/or encryption/decryption key to be used in writing data to or reading data from the PWCD 150. The operation 1012 can include using the determined encryption process and/or determined encryption key to encrypt data to be written to the PWCD 150. A first key 110B can be used with or without the identifier to determine the memory location. A second key 110C can be used with or without the identifier to determine the access password. A third key 110D can be used with or without the identifier to determine the encryption/decryption process and/or encryption/decryption key.

Based on the memory organization, access password, and/or operation to be performed in the request 1002, the AWCD 101 can issue a request 1014 to read or write data to a specific memory location, such as to satisfy the request 1002. The request 1014 can include data identifying the determined memory location, access password, and/or encrypted data, as determined or generated at operation 1012. At operation 1016, the PWCD 150 can retrieve data from (or write data to) the memory location identified in the request 1014. The operation 1016 can be performed in response to receiving the request 1014. The PWCD 150 can issue a response 1018 with data from the memory location identified in the request 1014 (in instances in which the request is a read request) or with an acknowledge or a negative acknowledge (in instances in which the request is a write request). At operation 1020, the AWCD 101 can format a response to the request 1002. The formatted response can be provided to the controller device 120 as a response 1022. The response 1022 can be to confirm that the request 1002 was fulfilled or indicate that the request 1002 is unfulfilled. The response 1022 can include data indicating one or more reasons that the request is unfulfilled, such as in the form of one or more error codes. The response 1022 can include information regarding authenticity or use of the PWCD 150.

Figure 11:
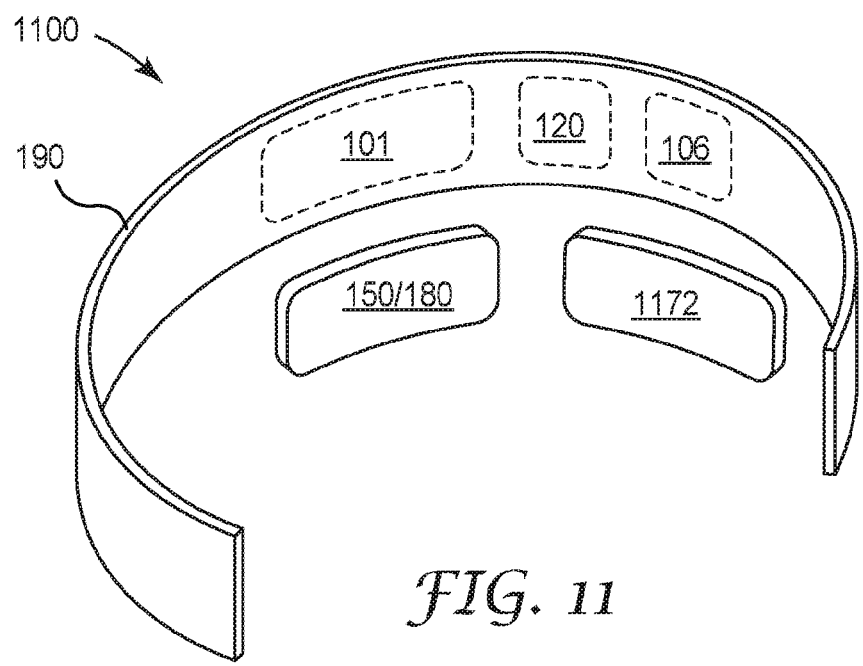
FIG. 11 illustrates, by way of example, a perspective view diagram of an embodiment of a wireless authentication system.

FIG. 11 illustrates, by way of example, a diagram of an embodiment of a wireless authentication system 1100. The system 1100 as illustrated includes the electronic device 190, the AWCD 101, the controller 120, the power circuitry 106, the PWCD 150 physically connected to the patch 180, and an optional electronic device 1172. The electronic device 190 in the embodiment of FIG. 11 is a wearable electronic device, such as in the form of a wrap, ring, broach, bracelet, or the like. The AWCD 101, controller 120, and/or the power circuitry 106 can be integrated with the electronic device 190, such as to be on, or at least partially in, the electronic device 190 (as indicated by the dashed lines). The patch 180 can be physically connected to the electronic device 190 near the AWCD 101. The patch 180, as previously discussed, can include a fluid detection device, conformable electrode, or other sensor or component thereon or at least partially therein. The PWCD 150 can include data 162 on the memory 158 that indicates usage of a component on the patch 180. The electronic device 1172 can be coupled wired or wirelessly to the controller 120 and/or the AWCD 101. The electronic device 1172 can include a speaker, conformable electrode, diode (e.g., light emitting diode), a sensor, or other component. The controller 120 and/or AWCD 101 can provide one or more signals to the electronic device 1172 that cause the electronic device 1172 to perform an operation, such as making a measurement using the sensor, providing electrical current using the electrode, make a noise using the speaker, and/or turn on/off the diode, among others. In one or more embodiments, the electronic device 1172 can be physically connected to the electronic device 190.

Figure 12:
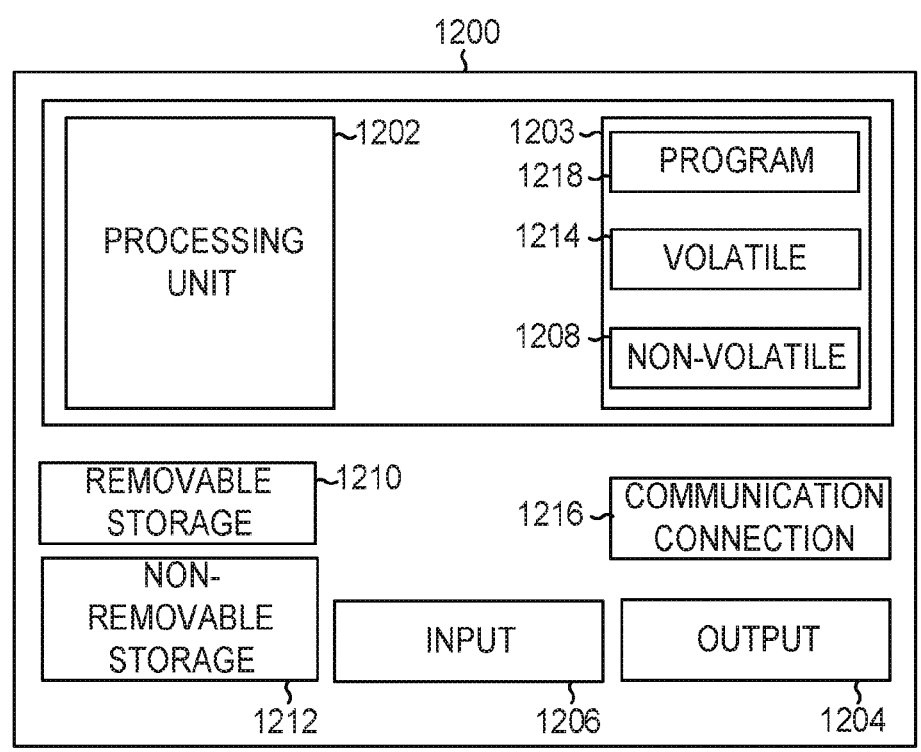
FIG. 12 illustrates, by way of example, a block diagram of an embodiment of a machine (e.g., a device or system) to implement at least a portion of a wireless authentication technique.

FIG. 12 illustrates, by way of example, a block diagram of an embodiment of a machine (e.g., a device or system) to implement at least a portion of a wireless authentication technique. One example machine 1200 (in the form of a computer), may include a processing unit 1202, memory 1203, removable storage 1210, and non-removable storage 1212. Although the example computing device is illustrated and described as machine 1200, the computing device may be in different forms in different embodiments. For example, the computing device may instead be a smartphone, a tablet, smartwatch, wearable device, patch, wireless reader, wireless tag, or other computing device including the same or similar elements as illustrated and described regarding FIG. 12. Devices such as smartphones, tablets, wearable devices, wireless readers, wireless tags, and smartwatches are generally collectively referred to as mobile devices. Further, although the various data storage elements are illustrated as part of the machine 1200, the storage may also or alternatively include cloud-based storage accessible via a network, such as the Internet. One or more of the AWCD 101, the controller device 120, and/or the PWCD 150 can include one or more components of the machine 1200 or may be implemented using the machine 1200.

Memory 1203 may include volatile memory 1214 and non-volatile memory 1208. The machine 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the machine 1200, and other input devices. The computer may operate in a networked environment using a communication connection to connect to one or more remote computers, such as database servers, including cloud based servers and storage. The remote computer may include a personal computer (PC), server, router, network PC, a peer device or another common network node, or the like. The communication connection may include a Local Area Network (LAN), a Wide Area Network (WAN), cellular, Institute of Electrical and Electronics Engineers (IEEE) 802.11 (Wi-Fi), Bluetooth, RF, NFC, or other network connection or communication.

Computer-readable instructions stored on a computer-readable storage device are executable by the processing unit 1202 of the machine 1200. A hard drive, CD-ROM, and RAM are some examples of articles including a non-transitory computer-readable medium such as a storage device. For example, a computer program 1218 may be used to cause processing unit 1202 to perform one or more methods or algorithms described herein.

Example Embodiments

The following example embodiments are provided, the numbering of which is not to be construed as designating levels of importance:

Embodiment A1 can include a wireless authentication system including:
an active wireless communication device including a first memory, first processing circuitry, and a first antenna, the first processing circuitry to:
produce an identifier request for an identifier (ID) and cause the first antenna to transmit the identifier request;
receive the ID in a response to the identifier request;
identify, based on the ID and data in the first memory, a location of a second memory to access;
produce an access request for the identified location of the second memory and cause the first antenna to transmit the access request; and
receive a response to the access request;
a passive wireless communication device including a second memory, second processing circuitry, a second antenna, and a power harvesting circuitry to convert electromagnetic power incident on the second antenna to electrical power for the second memory and the second processing circuitry, the second processing circuitry to:
produce the response to the identifier request, the response including the ID, and cause the second antenna to produce the response;
receive the access request;
retrieve data from or write data to the identified location of the second memory based on the access request; and
cause the second antenna to transmit the response to the access request.

In Embodiment A2, the system of Embodiment A1 can include, wherein the first and second antennas are configured to operate in a radio frequency (RF) or Near Field Communication (NFC) frequency range.

In Embodiment A3 the system of at least one of Embodiments A1-A2 can include, wherein the first processing circuitry is further to:
retrieve, from the first memory, a first key of one or more keys stored on the first memory; and
wherein the location of the second memory to access is further identified based on the first key.

In Embodiment A4 the system of Embodiment A3 can include, wherein the location of the second memory to access is determined by hashing one or more of the first key, the identifier, and a combination thereof, and using the hash value as an index to a lookup table in the first memory, the lookup table detailing contents of at least a portion of the second memory.

In Embodiment A5 the system of at least one of Embodiments A3-A4 can include, wherein the location of the second memory to access is determined by using one or more of the first key, the identifier, and a combination thereof as an index to a lookup table in the first memory.

In Embodiment A6 the system of at least one of Embodiments A1-A5 can include, wherein the identifier includes one or more of a unique identifier of the passive wireless communication device, an originality signature of the passive wireless communication device, tamper identification data of the passive wireless communication device, and a physical characteristic of the passive wireless communication device.

In Embodiment A7 the system of at least one of Embodiments A1-A6 can include, wherein the first processing circuitry is further to determine, based on the identifier, a process of a plurality of processes to use to determine the location in the first memory.

In Embodiment A8 the system of Embodiment A7 can include, wherein the first processing circuitry is further to use a second key to determine the process to use to determine the location in the first memory.

In Embodiment A9 the system of at least one of Embodiments A1-A8 can further include:
a wearable patch; and
wherein the passive wireless communication device is physically connected to the wearable patch.

In Embodiment A10 the system of Embodiment A9 can include, wherein the wearable patch includes a conformable electrode.

In Embodiment A11 the system of Embodiment A9 can include, wherein the wearable patch includes a fluid detection device to measure an amount of fluid incident thereon or therein.

In Embodiment A12 the system of at least one of Embodiments A9-A11 can further include:
a wearable electronic device; and
wherein the wearable electronic device is physically connected to the wearable patch.

In Embodiment A13 the system of Embodiment A12 can include, wherein the wearable electronic device is configured to be worn on or around one or more of a wrist, hand, head, waist, chest, ankle, arm, shoulder, leg, knee, and foot.

In Embodiment A14 the system of at least one of Embodiments A12-A13 can further include a moisture wicking material and wherein the passive wireless communication device is physically connected to the moisture wicking material.

In Embodiment A15 the system of at least one of Embodiments A3-A14 can include, wherein the first processing circuitry is further to:
determine an access password of the passive wireless communication device based on one or more of the identifier and a third key of the one or more keys; and
wherein producing the access request for the identified location of the second memory includes providing the determined access password in the access request.

In Embodiment A16 the system of Embodiment A15 can include, wherein the first processing circuitry is further to:
identify the third key of the one or more keys; and
wherein the password is further determined based on the identified third key and the identifier.

In Embodiment A17 the system of at least one of Embodiments A15-A16 can include, wherein the first processing circuitry is further to determine, based on one or more of a fourth key of the one or more keys and the identifier, a second process of a plurality of processes to use to determine the password of the passive wireless communication device.

In Embodiment A18 the system of Embodiment A17 can include, wherein the first processing circuitry is further to:
identify the fourth key of the one or more keys; and
wherein the second process of the plurality of processes is further determined based on the identified fourth key and the identifier.

In Embodiment A19 the system of at least one of Embodiments A3-A18 can include, wherein the first processing circuitry is further to:
determine an encryption/decryption process based on one or more of a fifth key of the one or more keys and the identifier; and
encrypt/decrypt data to/from the second memory using the determined encryption/decryption process.

In Embodiment A20 the system of Embodiment A19 can include, wherein the first processing circuitry is further to:
identify the fifth key of the one or more keys; and
wherein the encryption/decryption process is further determined based on the identified fifth key and the identifier.

In Embodiment A21 the system of at least one of Embodiments A19-A20 can include, wherein the first processing circuitry is to encrypt data to be written to the second memory, the access request is a write request, and the response is an acknowledge communication.

In Embodiment A22 the system of at least one of Embodiments A19-A20 can include, wherein the first processing circuitry is to decrypt data read from the second memory, the access request is a read request, and the response includes encrypted data from the memory location.

In Embodiment A23 the system of at least one of Embodiments A19-A22 can include, wherein the first processing circuitry is further to:
determine an encryption/decryption key based on one or more of a sixth key of the one or more keys and the identifier; and
encrypting/decrypting data to/from the second memory using the determined encryption/decryption key.

In Embodiment A24 the system of Embodiment A23 can include, wherein the first processing circuitry is further to:
identify the sixth key of the one or more keys, and
wherein the encryption/decryption key is further determined based on the identified sixth key and the identifier.

In Embodiment A25 the system of at least one of Embodiments A1-A24 can include, wherein the access request is to write data to the second memory that indicates usage of an object physically connected to the passive wireless communication device.

In Embodiment A26 the system of Embodiment A25 can include, wherein the passive wireless communication device includes tamper circuitry that prevents altering the data that indicates usage of the object.

In Embodiment A27 the system of at least one of Embodiments A1-A25 can include, wherein the passive wireless communication device further includes tamper circuitry that causes data to be written to the second memory in response to an electrical connection to the tamper circuitry being broken.

In Embodiment A28 the system of at least one of Embodiments A1-A27 can include, wherein the access request is to read data indicating usage of an object physically connected to the passive wireless communication device and the response includes the data indicating usage of the object.

In Embodiment A29 the system of at least one of Embodiments A1-A28 can include, wherein the first processing circuitry is to use a cryptographic process to determine the memory location.

In Embodiment A30 the system of at least one of Embodiments A1-A29 can include, wherein the memory location includes multiple separated blocks of the second memory.

In Embodiment A31 the system of at least one of Embodiments A1-A30 can include, wherein the first circuitry is further to write pseudo-random or random data to one or more other memory locations of the second memory.

Embodiment B1 includes an active wireless communication device including:
a first memory including a lookup table detailing a memory organization of a second memory of a passive wireless communication device stored thereon;
processing circuitry;
power circuitry to provide electrical power to the first memory and the processing circuitry;
and a first antenna;
the processing circuitry to:
produce an identifier request for an identifier (ID) of the passive wireless communication device and cause the first antenna to transmit the identifier request;
receive the ID in a response to the identifier request;
identify, based on the ID and data in the lookup table, a location of the second memory to access;
produce an access request for the identified location of the second memory and cause the first antenna to transmit the access request; and
receive a response to the access request from the passive wireless communication device.

In Embodiment B2 the device of Embodiment B1 can include, wherein the first antenna is configured to operate in a radio frequency (RF) or Near Field Communication (NFC) frequency range.

In Embodiment B3 the device of at least one of Embodiments B1-B2 can include, wherein the processing circuitry is further to:
retrieve, from the first memory, a first key of one or more keys stored on the first memory; and
wherein the location of the second memory to access is further identified based on the first key.

In Embodiment B4 the device of at least one of Embodiments B1-B3 can include, wherein the location of the second memory to access is determined by hashing at least a portion of one or more of the first key, the identifier, and a combination thereof, and using the hash value as an index to the lookup table.

In Embodiment B5 the device of at least one of Embodiments B1-B4 can include, wherein the location of the second memory to access is determined by using at least a portion of one or more of the first key, the identifier, and a combination thereof as an index to the lookup table.

In Embodiment B6 the device of at least one of Embodiments B1-B5 can include, wherein the identifier includes one or more of a unique identifier of the passive wireless communication device, an originality signature of the passive wireless communication device, tamper identification data of the passive wireless communication device, and a physical characteristic of the passive wireless communication device.

In Embodiment B7 the device of at least one of Embodiments B1-B6 can include, wherein the first processing circuitry is further to determine, based on at least one of the identifier and a second key of the one or more keys, a process of a plurality of processes to use to determine the location in the first memory.

In Embodiment B8 the device of Embodiment B7 can include, wherein determining the process of the plurality of processes is further determined based on the identifier and the second key.

In Embodiment B9 the device of at least one of Embodiments B1-B8 can further include:
a wearable electronic device; and
wherein the first memory, processing circuitry, power circuitry, and the first antenna are physically connected to the wearable electronic device.

In Embodiment B10 the device of Embodiment B9 can include, wherein the wearable electronic device is configured to be worn on one or more of a wrist, hand, head, waist, chest, ankle, arm, shoulder, leg, knee, and foot.

In Embodiment B11 the device of at least one of Embodiments B1-B10 can include, wherein the processing circuitry is further to:
determine a password of the passive wireless communication device based on one or more of a third key of the one or more keys and the identifier; and
wherein producing the access request for the identified location of the second memory includes providing the determined password in the access request.

In Embodiment B12 the device of Embodiment B11 can include, wherein the processing circuitry is further to:
identify the third key of the one or more keys in the first memory; and
wherein the password is further determined based on the third key and the identifier.

In Embodiment B13 the device of at least one of Embodiments B11-B12 can include, wherein the first processing circuitry is further to determine, based on one or more of a fourth key of the one or more keys and the identifier, a process of a plurality of processes to use to determine the password of the passive wireless communication device.

In Embodiment B14 the device of Embodiment B13 can include, wherein the first processing circuitry is further to identify the fourth key of the one or more keys, and wherein the process of the plurality of processes is further determined based on the fourth key and the identifier.

In Embodiment B15 the device of at least one of Embodiments B1-B14 can include, wherein the first processing circuitry is further to:
determine an encryption/decryption process based on one or more of a fifth key of the one or more keys and the identifier; and
encrypt/decrypt data to/from the second memory using the determined encryption/decryption process.

In Embodiment B16 the device of Embodiment B15 can include, wherein the processing circuitry is further to:
identify the fifth key of the one or more keys in the first memory; and
wherein the encryption/decryption process is further determined based on the fifth key and the identifier.

In Embodiment B17 the device of at least one of Embodiments B1-B16 can include, wherein the processing circuitry is further to:
determine an encryption/decryption key based on one or more of a sixth key of the one or more keys and the identifier; and
encrypt/decrypt data to/from the second memory using the determined encryption/decryption key.

In Embodiment B18 the device of Embodiment B17 can include, wherein the processing circuitry is further to:
identify the sixth key of the one or more keys in the first memory; and
wherein the encryption/decryption process is further determined based on the sixth key and the identifier.

In Embodiment B19 the device of at least one of Embodiments B15-B18 can include, wherein the processing circuitry is to encrypt data to be written to the second memory, the access request is a write request, and the response is an acknowledge confirmation communication.

In Embodiment B20 the device of at least one of Embodiments B15-B18 can include, wherein the processing circuitry is to decrypt data read from the second memory, the access request is a read request, and the response includes encrypted data from the memory location.

In Embodiment B21 the device of at least one of Embodiments B1-B20 can include, wherein the access request is to write data to the second memory that indicates usage of an object physically connected to the passive wireless communication device.

In Embodiment B22 the device of at least one of Embodiments B1-B21 can include, wherein the access request is to read data indicating usage of an object physically connected to the passive wireless communication device and the response includes the data indicating usage of the object.

In Embodiment B23 the device of at least one of Embodiments B1-B22 can include, wherein the processing circuitry is to use a cryptographic process to determine the location of the second memory to access.

In Embodiment B24 the device of at least one of Embodiments B1-B23 can include, wherein the location of the second memory to access includes multiple separated blocks of the second memory.

In Embodiment B25 the device of at least one of Embodiments B1-B24 can include, wherein the processing circuitry is further to provide write requests to write pseudo-random or random data to a plurality of memory locations of the second memory.

Embodiment C1 includes a device including:
a memory including data indicating an identifier stored thereon at a first memory location and pseudo-random data stored thereon at a second memory location;
an antenna;
processing circuitry; and
harvesting circuitry to convert electromagnetic waves from an active wireless communication device incident thereon to electrical power and provide the power to the processing circuitry and the memory;
the processing circuitry to:
produce a response to a request from the active wireless communication device for the contents of the first memory location, the response including the identifier; and
cause the antenna to transmit the response.

In Embodiment C2 the device of Embodiment C1 can further include:
receive an access request for a third memory location;
retrieve data from or write data to the third memory location of the second memory based on the access request; and
cause the antenna to transmit a response to the access request.

In Embodiment C3 the device of at least one of Embodiments C1-C2 can include, wherein the antenna is a radio frequency (RF) or Near Field Communication (NFC) antenna In Embodiment C4 the device of at least one of Embodiments C1-C3 can include, wherein the identifier includes one or more of a unique identifier of the device, an originality signature of the device, tamper identification data of the device, and a physical characteristic of the device.

In Embodiment C5 the device of at least one of Embodiments C1-C4 can include:
a wearable patch; and
wherein the memory, harvesting circuitry, antenna, and processing circuitry are physically connected to the wearable patch.

In Embodiment C6 the device of Embodiment C5 can include, wherein the wearable patch includes a conformable electrode.

In Embodiment C7 the device of Embodiment C6 can include, wherein the wearable patch includes fluid measuring circuitry to determine an amount of fluid incident thereon or therein.

In Embodiment C8 the device of at least one of Embodiments C5-C7 can include:
a wearable electronic device; and
wherein the wearable patch is physically connected to the wearable electronic device.

In Embodiment C9 the device of Embodiment C8 can include, wherein the wearable electronic device is configured to be worn on one or more of a wrist, hand, head, waist, chest, ankle, arm, shoulder, leg, knee, and foot.

In Embodiment C10 the device of at least one of Embodiments C1-C9 can include a wicking material, wherein the processing circuitry is physically connected to the material.

In Embodiment C11 the device of at least one of Embodiments C2-C10 can include, wherein the processing circuitry is further to:
identify a password in the access request;
determine whether the password matches an access password of the memory; and
wherein retrieval of the data occurs in response to determining the passwords match.

In Embodiment C12 the device of at least one of Embodiments C1-C11 can include, wherein the access request is to write data to the memory that indicates usage of an object physically connected to the device and wherein the device further includes tamper circuitry that prevents altering the data that indicates usage of the object.

In Embodiment C13 the device of at least one of Embodiments C1-C11 can include, wherein the passive wireless communication device further includes tamper circuitry that causes data to be written to the memory in response to an electrical connection to the tamper circuitry being broken.

In Embodiment C14 the device of at least one of Embodiments C1-C13 can include, wherein the memory location includes multiple separated blocks of the memory.

In Embodiment C15 the device of at least one of Embodiments C1-C14 can include, wherein the first circuitry is further to:
receive, from the active wireless communication device, a write request to write pseudo-random or random data to the memory locations.

Embodiment D1 includes a method for wireless authentication including:
an active wireless communication device including a first memory, first processing circuitry, and a first antenna, the first processing circuitry to:
producing, using first processing circuitry of an active wireless communication device (AWCD), an identifier request for an identifier (ID);
causing, using the first processing circuitry, a first antenna of the AWCD to transmit the identifier request;
receiving the requested ID in a response from a passive wireless communication device (PWCD) to the identifier request;
identifying, based on the ID and data in the first memory, a location of a second memory to access;
producing an access request for the identified location of the second memory and causing the first antenna to transmit the access request; and
receiving a response to the access request.

In Embodiment D2 the method of Embodiment D1 can include:
producing, at second processing circuitry of the PWCD, the response to the identifier request, the response including the ID;
causing a second antenna of the PWCD to produce the response;
receiving, at the PWCD, the access request;
retrieving data from or writing data to the identified location of a second memory of the PWCD based on the access request; and
causing the second antenna to transmit the response to the access request.

In Embodiment D3 the method of Embodiment D2 can include:
receiving, at the PWCD, a power signal from the AWCD;
converting, using power harvesting circuitry of the PWCD, the received power to electrical power for the second memory and the second processing circuitry.

In Embodiment D4 the method of at least one of Embodiments D1-D3 can include 3, wherein the first and/or second antennas are configured to operate in a radio frequency (RF) or Near Field Communication (NFC) frequency range.

In Embodiment D5 the method of at least one of Embodiments D1-D4 can include:
retrieving, using the first processing circuitry and from the first memory, a first key of one or more keys stored on the first memory; and wherein identifying the location of the second memory to access includes further identifying the location based on the first key.

In Embodiment D6 the method of Embodiment D5 can include, wherein determining the location of the second memory includes hashing one or more of the first key, the identifier, and a combination thereof, and using the hash value as an index to a lookup table in the first memory, the lookup table detailing contents of at least a portion of the second memory.

In Embodiment D7 the method of at least one of Embodiments D5-D6 can include, wherein determining the location of the second memory to access includes determining, by using one or more of the first key, the identifier, and a combination thereof as an index to a lookup table in the first memory.

In Embodiment D8 the method of at least one of Embodiments D1-D7 can include, wherein the identifier includes one or more of a unique identifier of the PWCD, an originality signature of the PWCD, tamper identification data of the PWCD, and a physical characteristic of the PWCD.

In Embodiment D9 the method of at least one of Embodiments D1-D8 can include determining, based on the identifier, a process of a plurality of processes to use to determine the location in the first memory.

In Embodiment D10 the method of Embodiment D9 can include, wherein further including, determining, using a second key, the process to use to determine the location in the first memory.

In Embodiment D11 the method of at least one of Embodiments D1-D10 can include providing, using a conformable electrode of a wearable patch to which the PWCD is physically connected, electrical power to a surface of an object on which the patch is situated.

In Embodiment D12 the method of at least one of Embodiments D1-D11 can include measuring, using a fluid detection device of a wearable patch to which the PWCD is physically connected, an amount of fluid incident on or in the fluid detection device.

In Embodiment D13 the method of at least one of Embodiments D1-D12 can include situating a wearable electronic device to which the AWCD is physically connected on or around one or more of a wrist, hand, head, waist, chest, ankle, arm, shoulder, leg, knee, and foot.

In Embodiment D14 the method of at least one of Embodiments D1-D13 can include, wherein the PWCD is physically connected to a moisture wicking material.

In Embodiment D15 the method of at least one of Embodiments D1-D14 can include:
determining an access password of the PWCD based on one or more of the identifier and a third key of the one or more keys; and
wherein producing the access request for the identified location of the second memory includes providing the determined access password in the access request.

In Embodiment D16 the method of Embodiment D15 can include:
identifying the third key of the one or more keys; and
determining the access password includes determining the access password based on the identified third key and the identifier.

In Embodiment D17 the method of at least one of Embodiments D15-D16 can include determining, based on one or more of a fourth key of the one or more keys and the identifier, a second process of a plurality of processes to use to determine the password of the PWCD.

In Embodiment D18 the method of Embodiment D17 can include:
identifying the fourth key of the one or more keys; and
wherein determining the second process of the plurality of processes includes determining the second process based on the identified fourth key and the identifier.

In Embodiment D19 the method of at least one of Embodiments D1-D18 can include:
determining an encryption/decryption process based on one or more of a fifth key of the one or more keys and the identifier; and
encrypting/decrypting data to/from the second memory using the determined encryption/decryption process.

In Embodiment D20 the method of Embodiment D19 can include:
identifying the fifth key of the one or more keys; and
determining the encryption/decryption process includes determining the encryption/decryption process based on the identified fifth key and the identifier.

In Embodiment D21 the method of at least one of Embodiments D19-D20 can include, wherein the encryption/decryption process is an encryption process to encrypt data to be written to the second memory, the access request is a write request, and the response is an acknowledge communication.

In Embodiment D22 the method of at least one of Embodiments D19-D20 can include, wherein the encryption/decryption process is a decryption process to decrypt data read from the second memory, the access request is a read request, and the response includes encrypted data from the memory location.

In Embodiment D23 the method of at least one of Embodiments D1-D22 can include:
determining an encryption/decryption key based on one or more of a sixth key of the one or more keys and the identifier; and
encrypting/decrypting data to/from the second memory using the determined encryption/decryption key.

In Embodiment D24 the method of Embodiment D23 can include:
identifying the sixth key of the one or more keys, and
wherein determining the encryption/decryption key includes determining the encryption/decryption key based on the identified sixth key and the identifier.

In Embodiment D25 the method of at least one of Embodiments D1-D24 can include, wherein the access request is to write data to the second memory that indicates usage of an object physically connected to the PWCD.

Embodiment D26 the method of Embodiment D25 can include preventing, using tamper circuitry of the PWCD, alteration of the data that indicates usage of the object.

In Embodiment D27. The method of at least one of Embodiments D1-D25 can include writing, in response to an electrical connection to tamper circuitry of the PWCD being broken, data to be written to the second memory that indicates tampering with the PWCD.

In Embodiment D28 the method of at least one of Embodiments D1-D27 can include, wherein the access request is to read data indicating usage of an object physically connected to the PWCD and the response includes the data indicating usage of the object.

In Embodiment D29 the method of at least one of Embodiments D1-D28 can include, wherein determining the memory location includes using a cryptographic process to determine the memory location.

In Embodiment D30 the method of at least one of Embodiments D1-D29 can include, wherein the memory location includes multiple separated blocks of the second memory.

In Embodiment D31 the method of at least one of Embodiments D1-D30 can include writing, using the first processing circuitry, pseudo-random or random data to one or more other memory locations of the second memory.

Embodiment E1 includes a method including:
producing, using processing circuitry and an antenna of an active wireless communication device (AWCD), an identifier request for an identifier (ID) of a passive wireless communication device (PWCD) and cause the first antenna to transmit the identifier request;
receiving, at the AWCD, the ID in a response to the identifier request;
identifying, based on the ID and data in a lookup table of a memory of the AWCD that details a memory organization of a second memory of the PWCD, a location of a second memory of the PWCD to access;
producing an access request for the identified location of the second memory;
causing the antenna to transmit the access request; and
receiving, from the PWCD, a response to the access request.

In Embodiment E2 the method of Embodiment E1 can include, wherein the antenna is configured to operate in a radio frequency (RF) or Near Field Communication (NFC) frequency range.

In Embodiment E3 the method of at least one of Embodiments E1-E2 can include, wherein the method further includes:
retrieving, from the first memory, a first key of one or more keys stored on the first memory; and
identifying the location of the second memory to access includes identifying the location based on the first key.

In Embodiment E4 the method of at least one of Embodiments E1-E3 can include, wherein identifying the location of the second memory to access includes hashing at least a portion of one or more of the first key, the identifier, and a combination thereof, and using the hash value as an index to the lookup table.

In Embodiment E5 the method of at least one of Embodiments E1-E4 can include, wherein identifying the location of the second memory to access includes using at least a portion of one or more of the first key, the identifier, and a combination thereof as an index to the lookup table.

In Embodiment E6 the method of at least one of Embodiments E1-E5 can include, wherein the identifier includes one or more of a unique identifier of the PWCD, an originality signature of the PWCD, tamper identification data of the PWCD, and a physical characteristic of the PWCD.

In Embodiment E7 the method of at least one of Embodiments E1-E6 can include determining, based on at least one of the identifier and a second key of the one or more keys, a process of a plurality of processes to use to determine the location in the first memory.

In Embodiment E8 the method of Embodiment E7, wherein determining the process of the plurality of processes includes further determining the process based on the identifier and the second key.

In Embodiment E9 the method of at least one of Embodiments E1-E8 can include:
situating a wearable electronic device that includes the PWCD physically connected thereto to one or more of a wrist, head, waist, chest, ankle, and foot.

In Embodiment E10 the method of at least one of Embodiments E1-E9 can include:
determining a password of the PWCD based on one or more of a third key of the one or more keys and the identifier; and
wherein producing the access request for the identified location of the second memory includes providing the determined password in the access request.

In Embodiment E11 the method of Embodiment E10 can include:
identifying the third key of the one or more keys in the first memory; and
wherein determining the password includes determining the password based on the third key and the identifier.

In Embodiment E12 the method of at least one of Embodiments E10-E11 can include determining, based on one or more of a fourth key of the one or more keys and the identifier, a process of a plurality of processes to use to determine the password of the passive wireless communication device.

In Embodiment E13 the method of Embodiment E12 can include identifying the fourth key of the one or more keys, and wherein determining the process of the plurality of processes includes determining the process based on the fourth key and the identifier.

In Embodiment E14 the method of at least one of Embodiments E1-E13 can include:
determining an encryption/decryption process based on one or more of a fifth key of the one or more keys and the identifier; and
encrypting/decrypting data to/from the second memory using the determined encryption/decryption process.

In Embodiment E15 the method of Embodiment E14 can include:
identifying the fifth key of the one or more keys in the first memory; and
wherein determining the encryption/decryption process includes determining the encryption/decryption process based on the fifth key and the identifier.

In Embodiment E16 the method of at least one of Embodiments E1-E15 can include:
determining an encryption/decryption key based on one or more of a sixth key of the one or more keys and the identifier; and
encrypting/decrypting data to/from the second memory using the determined encryption/decryption key.

In Embodiment E17 the method of Embodiment E16 can include:
identifying the sixth key of the one or more keys in the first memory; and
wherein determining the encryption/decryption process includes determining the encryption/decryption process based on the sixth key and the identifier.

In Embodiment E18 the method of at least one of Embodiments E14-E17 can include encrypting data to be written to the second memory, wherein the access request is a write request, and the response is an acknowledge confirmation communication.

In Embodiment E19 the method of at least one of Embodiments E14-E17 can include decrypting data read from the second memory, wherein the access request is a read request, and the response includes encrypted data from the memory location.

In Embodiment E20 the method of at least one of Embodiments E1-E19 can include, wherein the access request is to write data to the second memory that indicates usage of an object physically connected to the PWCD.

In Embodiment E21 the method of at least one of Embodiments E1-E20 can include, wherein the access request is to read data indicating usage of an object physically connected to the PWCD and the response includes the data indicating usage of the object.

In Embodiment E22 the method of at least one of Embodiments E1-E21 can include, wherein determining the location of the second memory to access includes using a cryptographic process.

In Embodiment E23 the method of at least one of Embodiments E1-E22 can include, wherein the location of the second memory to access includes multiple separated blocks of the second memory.

In Embodiment E24 the method of at least one of Embodiments E1-E23 can include providing write requests to write pseudo-random or random data to a plurality of memory locations of the second memory.

Embodiment F1 includes a method including:
receiving, from an active wireless communication device (AWCD) and at a passive wireless communication device (PWCD), a request to write pseudo-random data to a first location of a memory, the memory including data indicating an identifier stored thereon at a second location of the memory;
receiving, from the AWCD and at the PWCD, a request for contents of the memory location;
producing, by processing circuitry of the PWCD, a response to a request from the active wireless communication device for the contents of the memory location, the response including the identifier; and
causing an antenna of the PWCD to transmit the response.

In Embodiment F2 the method of Embodiment F1 can include:
receiving an access request for data at a third memory location of the memory;
retrieving data from or write data to the identified location of the memory based on the access request; and
causing the antenna to transmit a response to the access request.

In Embodiment F3 the method of at least one of Embodiments F1-F2 can include, wherein the antenna is a radio frequency (RF) or Near Field Communication (NFC) antenna.

In Embodiment F4 the method of at least one of Embodiments F1-F3 can include, wherein the identifier includes one or more of a unique identifier of the device, an originality signature of the device, tamper identification data of the device, and a physical characteristic of the device.

In Embodiment F5 the method of at least one of Embodiments F1-F4 can include, wherein the PWCD is physically connected to a wearable patch that includes a conformable electrode and the method further includes providing electrical current to an object on which the wearable patch is situated through the conformable electrode.

In Embodiment F6 the method of at least one of Embodiments F1-F5 can include, wherein the PWCD is physically connected to a wearable patch that includes a fluid detection device and the method further includes measuring an amount of fluid on an object on which the wearable patch is situated.

In Embodiment F7 the method of at least one of Embodiments F1-F6 can include, wherein the PWCD is physically connected to a wearable electronic device and the method further includes situating the wearable electronic device on or around an object.

In Embodiment F8 the method of Embodiment F7 can include, wherein the wearable electronic device is configured to be worn on one or more of a wrist, hand, head, waist, chest, ankle, arm, shoulder, leg, knee, and foot.

In Embodiment F9 the method of at least one of Embodiments F1-F8 can include, wherein the PWCD is physically connected to a moisture wicking material.

In Embodiment F10 the method of at least one of Embodiments F1-F9 can include:
identifying, by the processing circuitry of the PWCD, a password in the access request;
determining whether the password matches an access password of the memory; and
wherein retrieving the data occurs in response to determining the passwords match.

In Embodiment F11 the method of at least one of Embodiments F1-F10 can include, wherein the access request is to write data to the memory that indicates usage of an object physically connected to the device and wherein the device further includes tamper circuitry that prevents altering the data that indicates usage of the object.

In Embodiment F12 the method of at least one of Embodiments F1-F11 can include causing, by tamper circuitry of the PWCD, data to be written to the memory in response to an electrical connection to the tamper circuitry being broken.

In Embodiment F13 the method of at least one of Embodiments F1-F12 can include, wherein the memory location includes multiple separated blocks of the memory.

Embodiment G1 includes non-transitory machine-readable medium including instructions that, when executed by an active wireless communication device (AWCD), to perform operations including:
producing, using processing circuitry and an antenna of the AWCD, an identifier request for an identifier (ID) of a passive wireless communication device (PWCD) and cause the first antenna to transmit the identifier request;
receiving, at the AWCD, the ID in a response to the identifier request;
identifying, based on the ID and data in a lookup table of a memory of the AWCD that details a memory organization of a second memory of the PWCD, a location of a second memory of the PWCD to access;
producing an access request for the identified location of the second memory;
causing the antenna to transmit the access request; and
receiving, from the PWCD, a response to the access request.

In Embodiment G2 the non-transitory machine-readable medium of Embodiment G1, wherein the operations can include:
retrieving, from the first memory, a first key of one or more keys stored on the first memory; and
identifying the location of the second memory to access includes identifying the location based on the first key.

In Embodiment G3 the non-transitory machine-readable medium of at least one of Embodiments G1-G2 can include, wherein identifying the location of the second memory to access includes hashing at least a portion of one or more of the first key, the identifier, and a combination thereof, and using the hash value as an index to the lookup table.

In Embodiment G4 the non-transitory machine-readable medium of at least one of Embodiments G1-G3 can include, wherein identifying the location of the second memory to access includes using at least a portion of one or more of the first key, the identifier, and a combination thereof as an index to the lookup table.

In Embodiment G5 the non-transitory machine-readable medium of at least one of Embodiments G1-G4 can include, wherein the identifier includes one or more of a unique identifier of the PWCD, an originality signature of the PWCD, tamper identification data of the PWCD, and a physical characteristic of the PWCD.

In Embodiment G6 the non-transitory machine-readable medium of at least one of Embodiments G1-G5 can include, wherein the operations further include determining, based on at least one of the identifier and a second key of the one or more keys, a process of a plurality of processes to use to determine the location in the first memory.

In Embodiment G7 the non-transitory machine-readable medium of Embodiment G6 can include, wherein determining the process of the plurality of processes includes further determining the process based on the identifier and the second key.

In Embodiment G8 the non-transitory machine-readable medium of at least one of Embodiments G1-G7 can include, wherein the operations further include:
 determining a password of the PWCD based on one or more of a third key of the one or more keys and the identifier; and
 wherein producing the access request for the identified location of the second memory includes providing the determined password in the access request.

In Embodiment G9 the non-transitory machine-readable medium of Embodiment G8 can include:
 identifying the third key of the one or more keys in the first memory; and
 wherein determining the password includes determining the password based on the third key and the identifier.

In Embodiment G10 the non-transitory machine-readable medium of at least one of Embodiments G8-G9 can include, wherein the operations further include determining, based on one or more of a fourth key of the one or more keys and the identifier, a process of a plurality of processes to use to determine the password of the passive wireless communication device.

In Embodiment G11 the non-transitory machine-readable medium of Embodiment G9 can include, wherein the operations further include identifying the fourth key of the one or more keys, and wherein determining the process of the plurality of processes includes determining the process based on the fourth key and the identifier.

In Embodiment G12 the non-transitory machine-readable medium of at least one of Embodiments G1-G11 can include, wherein the operations further include:
 determining an encryption/decryption process based on one or more of a fifth key of the one or more keys and the identifier; and
 encrypting/decrypting data to/from the second memory using the determined encryption/decryption process.

In Embodiment G13 the non-transitory machine-readable medium of Embodiment G12 can include, wherein the operations further include:
 identifying the fifth key of the one or more keys in the first memory; and
 wherein determining the encryption/decryption process includes determining the encryption/decryption process based on the fifth key and the identifier.

In Embodiment G14 the non-transitory machine-readable medium of at least one of Embodiments G1-G13 can include, wherein the operations further include:
 determining an encryption/decryption key based on one or more of a sixth key of the one or more keys and the identifier; and
 encrypting/decrypting data to/from the second memory using the determined encryption/decryption key.

In Embodiment G15 the non-transitory machine-readable medium of Embodiment G14 can include, wherein the operations further include:
 identifying the sixth key of the one or more keys in the first memory; and
 wherein determining the encryption/decryption process includes determining the encryption/decryption process based on the sixth key and the identifier.

In Embodiment G16 the non-transitory machine-readable medium of at least one of Embodiments G12-B15 can include encrypting data to be written to the second memory, wherein the access request is a write request, and the response is an acknowledge confirmation communication.

In Embodiment G17 the non-transitory machine-readable medium of at least one of Embodiments G12-G15 can include, wherein the operations further include decrypting data read from the second memory, wherein the access request is a read request, and the response includes encrypted data from the memory location.

In Embodiment G18 the non-transitory machine-readable medium of at least one of Embodiments G1-G16 can include, wherein the access request is to write data to the second memory that indicates usage of an object physically connected to the PWCD.

In Embodiment G19 the non-transitory machine-readable medium of at least one of Embodiments G1-G18 can include, wherein the access request is to read data indicating usage of an object physically connected to the PWCD and the response includes the data indicating usage of the object.

In Embodiment G20 the non-transitory machine-readable medium of at least one of Embodiments G1-G19 can include, wherein determining the location of the second memory to access includes using a cryptographic process.

In Embodiment G21 the non-transitory machine-readable medium of at least one of Embodiments G1-G22 can include, wherein the location of the second memory to access includes multiple separated blocks of the second memory.

In Embodiment G22 the non-transitory machine-readable medium of at least one of Embodiments G1-G21 can include, wherein the operations further include providing write requests to write pseudo-random or random data to a plurality of memory locations of the second memory.

Embodiment H1 includes a non-transitory machine-readable medium including instructions that, when executed by a passive wireless communication device (PWCD), to perform operations including:
 receiving, from an active wireless communication device (AWCD) and at the PWCD, a request to write pseudo-random data to a first location of a memory, the memory including data indicating an identifier stored thereon at a second location of the memory;
 receiving, from the AWCD a request for contents of the memory location;
 producing, by processing circuitry of the PWCD, a response to a request from the active wireless communication device for the contents of the memory location, the response including the identifier; and
 causing an antenna of the PWCD to transmit the response.

In Embodiment H2 the non-transitory machine-readable medium of Embodiment H1 can include, wherein the operations further include:
 receiving an access request for data at a third memory location of the memory;
 retrieving data from or write data to the identified location of the memory based on the access request; and causing the antenna to transmit a response to the access request.

In Embodiment H3 the non-transitory machine-readable medium of at least one of Embodiments H1-H2 can include, wherein the antenna is a radio frequency (RF) or Near Field Communication (NFC) antenna.

In Embodiment H4 the non-transitory machine-readable medium of at least one of Embodiments H1-H3 can include, wherein the identifier includes one or more of a unique identifier of the device, an originality signature of the device, tamper identification data of the device, and a physical characteristic of the device.

In Embodiment H5 the non-transitory machine-readable medium of at least one of Embodiments H1-H4 can include, wherein the PWCD is physically connected to a wearable patch that includes a conformable electrode and wherein the operations further include providing electrical current to an object on which the wearable patch is situated through the conformable electrode.

In Embodiment H6 the non-transitory machine-readable medium of at least one of Embodiments H1-H5 can include, wherein the PWCD is physically connected to a wearable patch that includes a fluid detection device and wherein the operations further include measuring an amount of fluid on an object on which the wearable patch is situated.

In Embodiment H7 the non-transitory machine-readable medium of at least one of Embodiments H1-H6 can include, wherein the operations further include:
  identifying, by the processing circuitry of the PWCD, a password in the access request;
  determining whether the password matches an access password of the memory; and
  wherein retrieving the data occurs in response to determining the passwords match.

In Embodiment H8 the non-transitory machine-readable medium of at least one of Embodiments H1-H7 can include, wherein the access request is to write data to the memory that indicates usage of an object physically connected to the device and the operations further include preventing alteration of the data that indicates usage of the object.

In Embodiment H9 the non-transitory machine-readable medium of at least one of Embodiments H1-H8 can include, wherein the operations further include causing, by tamper circuitry of the PWCD, data to be written to the memory in response to an electrical connection to the tamper circuitry being broken.

In Embodiment H10 the non-transitory machine-readable medium of at least one of Embodiments H1-H9 can include, wherein the memory location includes multiple separated blocks of the memory.

What is claimed is:

1. A wireless authentication system comprising:
  an active wireless communication device coupled to a passive wireless communication device, the active wireless communication device comprising:
    a first memory configured to store a lookup table and one or more keys comprising at least a first key;
    first processing circuitry; and
    a first antenna, the passive wireless communication device comprising:
    a second memory,
    second processing circuitry,
    a second antenna, and a power harvesting circuitry configured to convert electromagnetic power incident on the second antenna to electrical power for the second memory and the second processing circuitry,
    the first processing circuitry being configured to:
      produce an identifier request for an identifier (ID);
      transmit, via the first antenna, the identifier request to the second antenna;
      receive, via the first antenna, from the second antenna, the ID in response to the identifier request;
      retrieve the first key from the first memory;
      hash a combination of the ID and the first key to form a hash value;
      use the hash value as an index to the lookup table, wherein the lookup table details contents of at least a portion of the second memory;
      identify, based on the index to the lookup table, a location in the second memory to access;
      produce an access request for the identified location in the second memory;
      transmit, via the first antenna, to the second antenna, the access request; and
      receive, via the first antenna, a response to the access request, wherein the second processing circuitry is configured to:
    produce the response to the identifier request transmitted by the first processing circuitry via the first antenna to the second antenna, wherein the response to the identifier request includes the ID;
    transmit, via the second antenna, to the first antenna the response to the identifier request;
    receive, via the second antenna, the access request;
    access the identified location in the second memory based on the access request; and
    transmit, via the second antenna, to the first antenna the response to the access request.

2. The wireless authentication system of claim 1, wherein the combination is a first combination, and wherein the first processing circuitry is further configured to use a second combination of a second key of the one or more keys and the ID to select a process from one or more processes to use to determine the location in the second memory.

3. The wireless authentication system of claim 1, further comprising a wearable patch that is physically coupled to the passive wireless communication device.

4. The wireless authentication system of claim 3, further comprising:
  a wearable electronic device that is physically coupled to the wearable patch.

5. The wireless authentication system of claim 1, further comprising a moisture wicking material that is physically coupled to the passive wireless communication device.

6. The wireless authentication system of claim 1, wherein the combination is a first combination, and wherein the first processing circuitry is further configured to:
  determine an encryption/decryption process based on a second combination of a third key of the one or more keys and the ID; and
  perform the encryption/decryption process on data stored to the identified location in the second memory.

7. The system of claim 6, wherein the first processing circuitry is further configured to:
  determine an encryption/decryption key based on a third combination of a fourth key of the one or more keys and the ID; and
  use the encryption/decryption key to perform the encryption/decryption process.

8. The system of claim 1, wherein the access request comprises a request to write, to the second memory, data that indicates usage of an object physically connected to the passive wireless communication device.

9. The wireless authentication system of claim 1, wherein to access the identified location in the second memory, the second processing circuitry is configured to retrieve data from the identified location in the second memory.

10. The wireless authentication system of claim 1, wherein to access the identified location in the second memory, the second processing circuitry is configured to write data to the identified location in the second memory.

11. The wireless authentication system of claim 1, wherein to hash the combination of the ID and the first key to form the hash value, the first processing circuitry is configured to apply a perfect hash function to form a perfect hash value.

12. The wireless authentication system of claim 1, wherein the hash value is a uniformly distributed hash value.

* * * * *